US012041062B2

(12) United States Patent
Gaffney et al.

(10) Patent No.: US 12,041,062 B2
(45) Date of Patent: *Jul. 16, 2024

(54) SYSTEMS FOR SECURELY TRACKING INCIDENT DATA AND AUTOMATICALLY GENERATING DATA INCIDENT REPORTS USING COLLABORATION ROOMS WITH DYNAMIC TENANCY

(71) Applicant: Cygnvs Inc., Los Altos, CA (US)

(72) Inventors: Kevin Gaffney, Dublin (IE); Paul Meagher, Dublin (IE); Marlon Rodrigues, Dublin (IE); Jordan McGrath, Dublin (IE); Omar Anshasi, Dublin (IE); Steve Qian, Toronto (CA); Yuli Mitsner, Toronto (CA); Biwei Tan, Toronto (CA); Arvind Parthasarathi, Los Altos, CA (US)

(73) Assignee: Cygnvs Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,580

(22) Filed: Sep. 7, 2023

(65) Prior Publication Data

US 2023/0421567 A1 Dec. 28, 2023

Related U.S. Application Data

(63) Continuation-in-part of application No. 18/242,211, filed on Sep. 5, 2023, which is a continuation-in-part
(Continued)

(51) Int. Cl.
*H04L 9/40* (2022.01)
*G06F 16/22* (2019.01)
*G06Q 10/101* (2023.01)

(52) U.S. Cl.
CPC ........ *H04L 63/105* (2013.01); *G06F 16/2246* (2019.01); *H04L 63/0853* (2013.01); *G06Q 10/101* (2013.01)

(58) Field of Classification Search
CPC ............... H04L 63/105; H04L 63/0853; G06F 16/2246; G06Q 10/101
(Continued)

(56) References Cited

U.S. PATENT DOCUMENTS 6,188,407 B1 2/2001 Smith
6,324,581 B1 11/2001 Xu et al.
(Continued)

OTHER PUBLICATIONS

Towards Secure Collaboration in Federated Cloud Environments, Suzic et al., Aug. 2016 (Year: 2016).*
(Continued)

*Primary Examiner* — Jahangir Kabir
(74) *Attorney, Agent, or Firm* — Carr & Ferrell LLP

(57) ABSTRACT

Systems for tracking incident data across phases of a data incident response including analysis, containment, and recovery, and automatically generating data incident reports are disclosed herein. Embodiments enable viewing of all the incident data in a single place including tracking of origin and history of the incident data to create an audit trail. Embodiments include managing incident data sharing and reporting including automatically generating and sharing data incident reports. Embodiments include a first feedback loop and a second feedback loop. The first feedback loop includes automatically surfacing to users changes to incident report specifications, errors or warnings in incident data with resolving recommendations including specific tasks to resolve the errors or warnings. The second feedback loop includes analyzing existing incident data based on reporting requirements to determine if the existing incident data is
(Continued)

already applicable and automatically mapping and tagging the existing incident data to data needed for reporting requirements.

25 Claims, 45 Drawing Sheets

Related U.S. Application Data of application No. 18/196,967, filed on May 12, 2023, which is a continuation-in-part of application No. 17/939,865, filed on Sep. 7, 2022, which is a continuation of application No. 17/476,367, filed on Sep. 15, 2021, now Pat. No. 11,477,208.

(58) Field of Classification Search
USPC .......................................................... 726/4
See application file for complete search history.

(56) References Cited

U.S. PATENT DOCUMENTS

| | | |
|---|---|---|
| 7,587,499 B1 | 9/2009 | Haghpassand |
| 8,151,323 B2 | 4/2012 | Harris |
| 8,832,268 B1 | 9/2014 | Chheda |
| 8,874,741 B2 | 10/2014 | Hassan et al. |
| 9,240,996 B1 | 1/2016 | Sinnema |
| 9,858,559 B2 | 1/2018 | Raleigh et al. |
| 9,953,007 B2 | 4/2018 | Oyarzabal et al. |
| 9,990,134 B2 | 6/2018 | Keeler |
| 10,182,045 B2 | 1/2019 | Banga et al. |
| 10,234,853 B2 | 3/2019 | Mukkamala et al. |
| 10,467,029 B1 | 11/2019 | Lin |
| 10,483,003 B1 | 11/2019 | McNair |
| 10,698,926 B2 | 6/2020 | Zhou et al. |
| 10,708,135 B1 | 7/2020 | Elliott |
| 10,797,964 B2 | 10/2020 | Chheda |
| 10,810,361 B1 | 10/2020 | Venkatraman et al. |
| 10,990,488 B1 | 4/2021 | Brown |
| 11,017,398 B2 | 5/2021 | Potadar et al. |
| 11,188,857 B1 | 11/2021 | Hill |
| 11,354,430 B1 | 6/2022 | Tharakan et al. |
| 11,477,208 B1 | 10/2022 | Urena |
| 11,526,825 B2 | 12/2022 | Avala et al. |
| 11,665,169 B2 * | 5/2023 | Viswanathan Iyer .... H04N 5/76 726/4 |
| 2005/0251500 A1 | 11/2005 | Vahalia et al. |
| 2008/0086363 A1 | 4/2008 | Kass |
| 2009/0307166 A1 | 12/2009 | Routray |
| 2010/0088636 A1 | 4/2010 | Yerkes |
| 2010/0169860 A1 | 7/2010 | Blazetti |
| 2011/0010349 A1 | 1/2011 | Ellingson et al. |
| 2011/0173679 A1 * | 7/2011 | Perumal .................. G06F 21/30 726/17 |
| 2012/0096521 A1 | 4/2012 | Peddada |
| 2012/0110651 A1 | 5/2012 | Van Biljon et al. |
| 2012/0158821 A1 | 6/2012 | Barros |
| 2013/0191531 A1 | 7/2013 | Kruglick |
| 2014/0089039 A1 | 3/2014 | McClellan |
| 2014/0278755 A1 | 9/2014 | Eberl et al. |
| 2015/0112700 A1 | 4/2015 | Sublett et al. |
| 2015/0120359 A1 | 4/2015 | Dongieux |
| 2015/0134733 A1 | 5/2015 | Maturana et al. |
| 2015/0154643 A1 | 6/2015 | Artman et al. |
| 2015/0163206 A1 | 6/2015 | McCarthy et al. |
| 2015/0172321 A1 | 6/2015 | Kirti et al. |
| 2015/0281453 A1 | 10/2015 | Maturana et al. |
| 2015/0310188 A1 | 10/2015 | Ford et al. |
| 2015/0324400 A1 | 11/2015 | Sheck et al. |
| 2016/0294854 A1 | 10/2016 | Parthasarathi et al. |
| 2016/0335260 A1 | 11/2016 | Convertino et al. |
| 2016/0378450 A1 | 12/2016 | Fu et al. |
| 2016/0378728 A1 | 12/2016 | Pryhuber |
| 2017/0006135 A1 | 1/2017 | Siebel et al. |
| 2017/0041296 A1 | 2/2017 | Ford et al. |
| 2017/0099181 A1 | 4/2017 | Hawking et al. |
| 2017/0124502 A1 | 5/2017 | Brew et al. |
| 2017/0132721 A1 | 5/2017 | Riley |
| 2017/0149630 A1 | 5/2017 | Feller et al. |
| 2017/0169699 A1 | 6/2017 | Will |
| 2017/0195265 A1 | 7/2017 | Billi |
| 2017/0255455 A1 | 9/2017 | Collier |
| 2017/0262142 A1 | 9/2017 | Riley |
| 2017/0282014 A1 | 10/2017 | Quinn |
| 2018/0027006 A1 | 1/2018 | Zimmermann et al. |
| 2018/0144314 A1 | 5/2018 | Miller |
| 2018/0152358 A1 | 5/2018 | Chheda |
| 2018/0165386 A1 | 6/2018 | Soundiramourthy et al. |
| 2018/0181716 A1 | 6/2018 | Mander et al. |
| 2018/0321820 A1 | 11/2018 | Burman |
| 2018/0365278 A1 | 12/2018 | Klöhn |
| 2019/0034047 A1 * | 1/2019 | Kwiecien ................ G06F 16/95 |
| 2019/0065177 A1 | 2/2019 | Khoongumjorn et al. |
| 2019/0095241 A1 | 3/2019 | Ago et al. |
| 2019/0102440 A1 | 4/2019 | Tabak et al. |
| 2019/0163814 A1 | 5/2019 | Codella |
| 2019/0325373 A1 | 10/2019 | Dillon et al. |
| 2019/0339821 A1 | 11/2019 | Vajjala |
| 2020/0007554 A1 | 1/2020 | Vincent et al. |
| 2020/0034764 A1 | 1/2020 | Panuganty |
| 2020/0067789 A1 | 2/2020 | Khuti et al. |
| 2020/0097920 A1 | 3/2020 | Doctor |
| 2020/0104401 A1 | 4/2020 | Burnett et al. |
| 2020/0104402 A1 | 4/2020 | Burnett et al. |
| 2020/0151836 A1 | 5/2020 | Lingras et al. |
| 2020/0160458 A1 | 5/2020 | Bodin |
| 2020/0162917 A1 | 5/2020 | Anantha et al. |
| 2020/0202271 A1 | 6/2020 | Brannon et al. |
| 2020/0210647 A1 | 7/2020 | Panuganty et al. |
| 2020/0218432 A1 | 7/2020 | Malhotra |
| 2020/0233685 A1 | 7/2020 | Petkov et al. |
| 2020/0234218 A1 | 7/2020 | Salloum et al. |
| 2020/0342520 A1 | 10/2020 | Pandey |
| 2020/0344185 A1 | 10/2020 | Singaraju et al. |
| 2020/0349173 A1 | 11/2020 | Chawla et al. |
| 2021/0120043 A1 | 4/2021 | Karpovsky |
| 2021/0160018 A1 | 5/2021 | Han |
| 2021/0275899 A1 | 9/2021 | Hyodo |
| 2021/0216381 A1 | 11/2021 | Huang |
| 2021/0409218 A1 * | 12/2021 | Elmenshawy ............ H04L 9/16 |
| 2022/0027828 A1 | 1/2022 | Avala et al. |
| 2023/0078169 A1 | 3/2023 | Urena et al. |
| 2023/0291744 A1 | 9/2023 | Gaffney et al. |

OTHER PUBLICATIONS

Sun et al., "Designing a Unified Cloud Log Analytics Platform," 2016 International Conference on Collaboration Technologies and Systems (CTS) , Orlando, FL, 2016, pp. 257-266, doi: 10.11 09/CTS.2016.0057.

Kilgore et al., "A Precision Information Environment (PIE) for emergency responders: Providing collaborative manipulation, role-tailored visualization, and integrated access to heterogeneous data," 2013 IEEE International Conference on Technologies for Homeland Security, 2013, 6 pages.

Yu et al., "Distributed Big Data Analytics in Service Computing," 2017 IEEE 13th International Symposium on Autonomous Decentralized System (ISADS), Bangkok, 2017, pp. 55-60, doi: 10.1109/ISADS.2017.17.

Czajkowski et al., "ERMrest: An Entity-relationship Data Storage Service for Web-based, Data-oriented Collaboration," Oct. 19, 2016, 12 pages.

Amrutiya et al., "Trustless Two-Factor Authentication using Smart Contracts in Blockchains," 2019 International Conference on Information Networking (ICOIN), Kuala Lumpur, Malaysia, doi: 10.1109/ICOIN.2019.8718198, 2019, pp. 66-71.

* cited by examiner

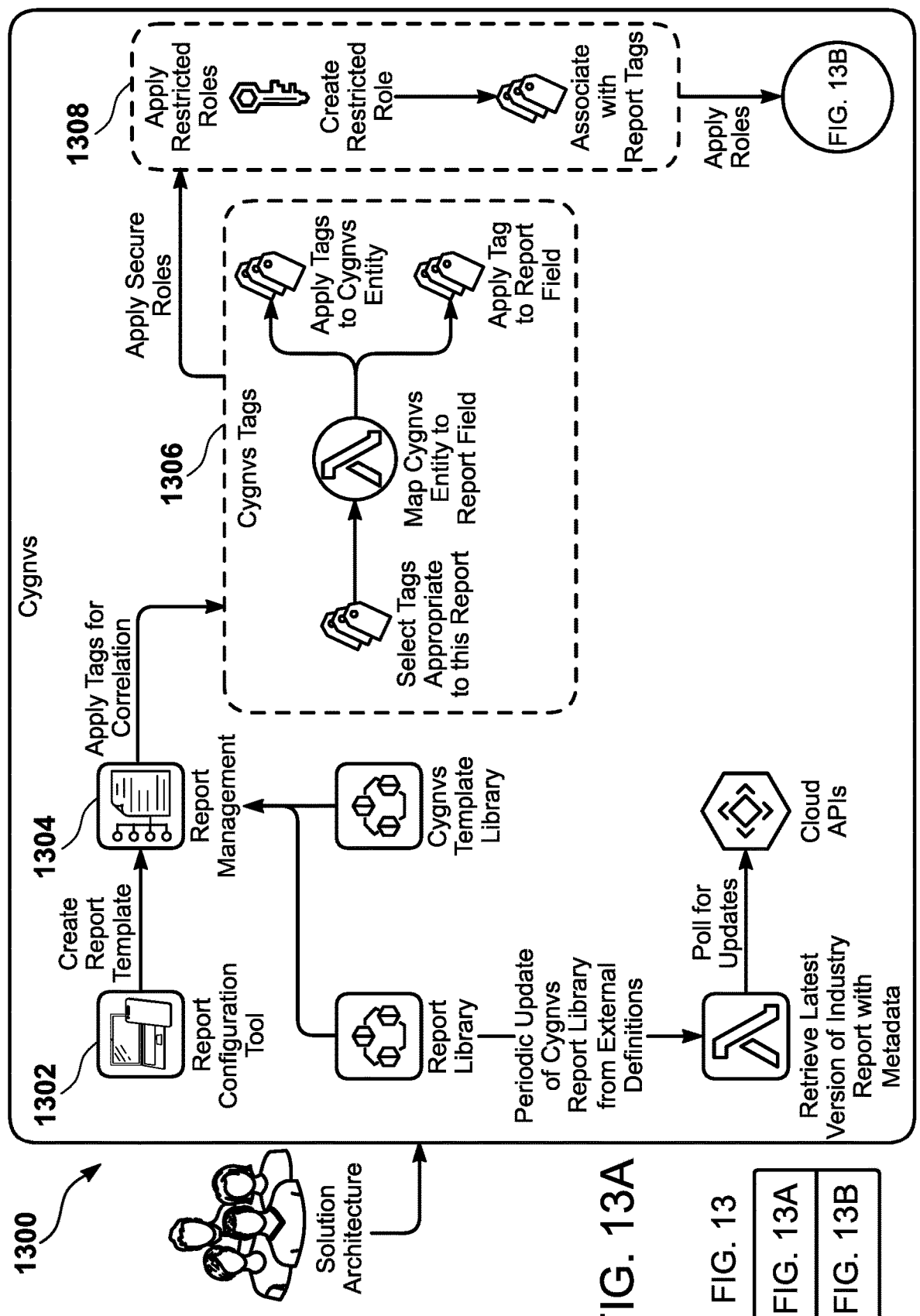

| FIG. 14A |
| FIG. 14B |

| FIG. 14A |
| FIG. 14B |

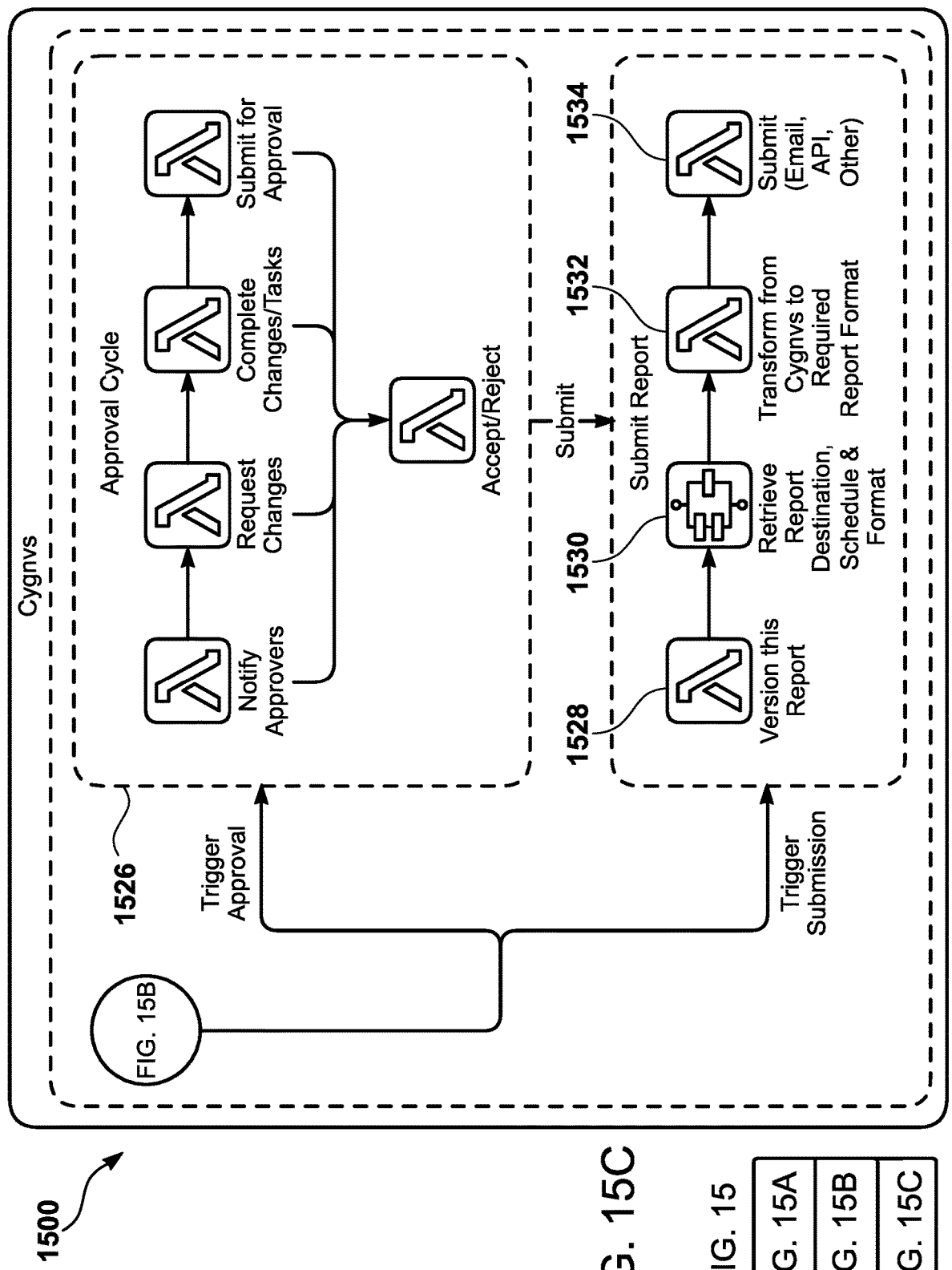

| FIG. 16A |
| FIG. 16B |

| FIG. 16A |
| FIG. 16B |

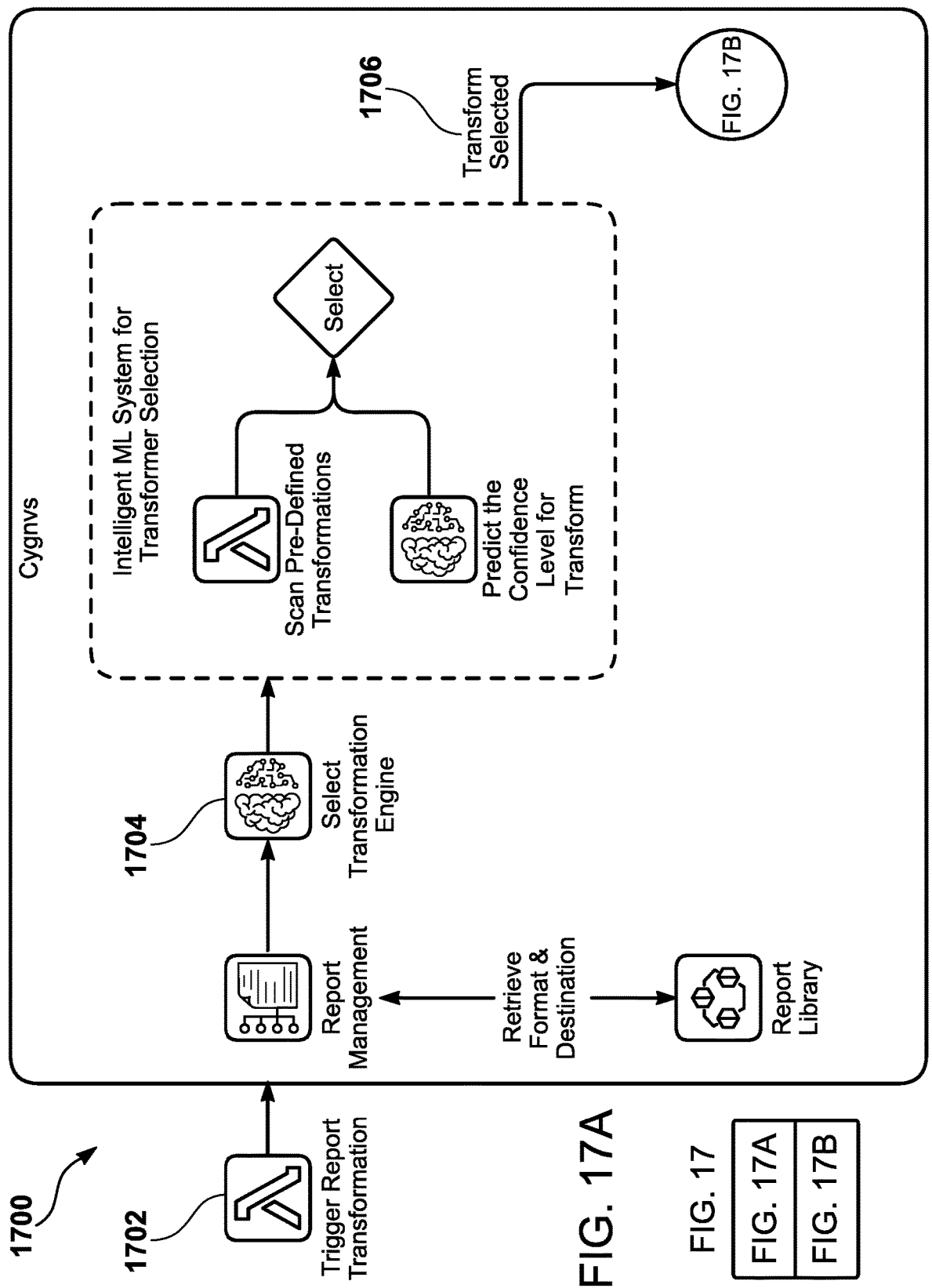

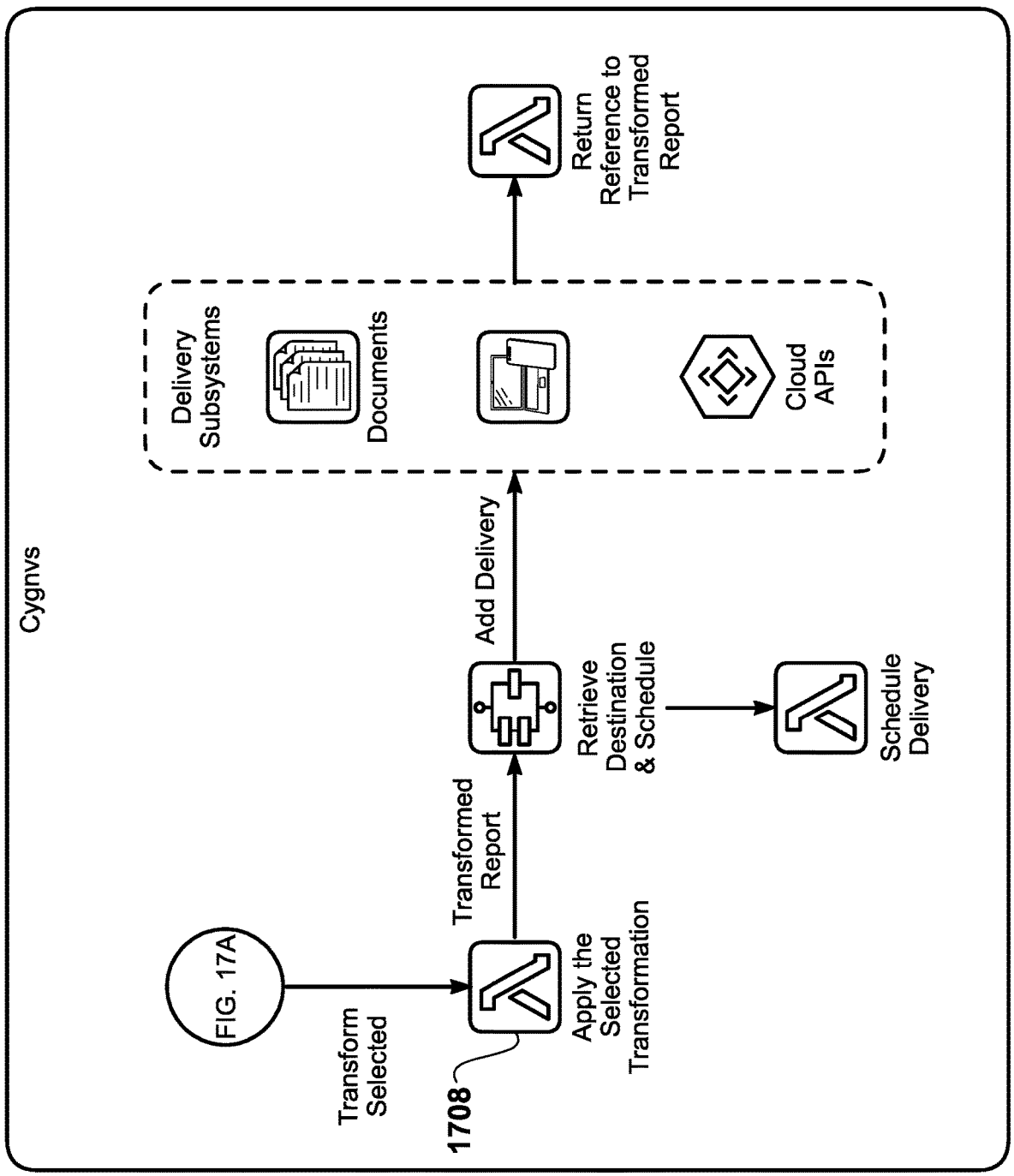

Add Report from Library  ✕
Select from available reports

Recommended based on your location (USA/NY) and industry (Health):

CISA Report
[USA] [CISA] [External] [Regulatory]
Report required to be submitted to CISA within 72 hours of incident
Conditions: Applicable if *personal information is compromised*
[ Submitted via API ] [ Preview ]

NY State Report
[USA] [New York] [External] [Regulatory]
Report required to be submitted to State within 15 Days of incident
Conditions: Applicable if *personal information is compromised*
[ Submitted via Email ] [ Preview ]

NY State Report
[USA] [New York] [External] [Regulatory]
Report required to be submitted to State within 15 Days of incident
Conditions: Applicable if *personal information is compromised*
[ Submitted via Email ] [ Preview ]

Other Available Reports:
[🔍 Filter for report]

Daily Exec Report
[Internal] [Exec]
Report required to be submitted to Exec Team every 12 hours
Conditions: Applicable if *incident is SEV-3 or higher*
[ Available through App ] [ Preview ]

24 Breach Council Report
[Internal] [Custom]
Report required to be submitted to Breach Council every 24 hours
Conditions: Applicable if *incident is SEV-3 or higher AND Breach Council Present*
[ Submitted via Email ] [ Preview ]

Insurance Update
[External] [Insurance] [Carrier] [Datga]
Report required to be submitted to Carrier after incident is closed
Conditions: Applicable if *incident is SEV-3 or higher AND Carrier Present*
[ Submitted via API ] [ Preview ]

3. Incident Description

Approximate start of incident? ⊛   When was this incident detected? ⊛   Timezone ⊛

-Field Not Mapped-   -Field Not Mapped-   -Field Not Mapped-

Brief description of the incident

-Field Not Mapped- ⊛

Link Field to Incident Data
Set of Manual Input
Ignore Warning

4. Impact Details

Was the confidentiality, integrity, and/or availability of your organization's information systems potentially compromised? ⊛

-Field Not Mapped-

What is the number of systems impacted? ⊛

-Field Not Mapped-

How many users are impacted? ⊛

-Field Not Mapped-

FIG. 22B

Link Field to Incident Data
Select from available company and incident data

🔍 Incident

| Name | Value | Type | In Use | Last Updated | Updated By | History |
|---|---|---|---|---|---|---|
| Start | 2023-06-1... | Incident | ☐ | 2 hours ago | 👤 | ↻ |
| Detected | 2023-06-1... | Incident | ☐ | 2 hours ago | 👤 | ↻ |
| Summary | - | Incident | ☐ | 15 minutes ago | 👤 | ↻ |
| Servers Impacted | 3 | Incident | ☐ | 1 hour ago | 👤 | ↻ |
| Users Impacted | 31,000 | Incident | ☐ | 1 hour ago | 👤 | ↻ |

[Cancel] [Link to Field] [Set Value]

---

Link Field to Incident Data
This Field was automatically linked to the report on June 15th, 2023

| Field in Report | Linked To | |
|---|---|---|
| Incident Description | Incident > Summary | [Unlink] |

Select from available company and incident data

🔍 Incident

| Name | Value | Type | In Use | Last Updated | Updated By | History |
|---|---|---|---|---|---|---|
| Start | 2023-06-1... | Incident | ☑ | 15 hours ago | 👤 | ↻ |
| Detected | 2023-06-1... | Incident | ☐ | 15 hours ago | 👤 | ↻ |
| Summary | Ongoing r... | Incident | ☐ | 30 minutes ago | 👤 | ↻ |
| Servers Impacted | 3 | Incident | ☐ | 1 hour ago | 👤 | ↻ |
| Users Impacted | 31,000 | Incident | ☐ | 1 hour ago | 👤 | ↻ |

[Cancel] [Update Link] [Update Value]

3. Incident Description

Approximate start of incident? ✻   When was this incident detected? ✻   Timezone ✻

2023-06-15 at 11:00am    2023-06-15 at 11:45am    EST

Brief description of the incident ✻

-No Data-

4. Impact Details

Was the confidentiality, integrity, and/or availability of your organization's information systems potentially compromised? ✻

-No Data-

What is the number of systems impacted? ✻

-No Data-

How many users are impacted? ✻

-No Data-

3. Incident Description

Approximate start of incident? When was this incident detected? Timezone

[2023-06-15 at 11:00am] [2023-06-15 at 11:45am] [EST]

Brief description of the incident

-No Data-

4. Impact Details

Was the confidentiality, integrity, and/or availability of your organization's information systems potentially compromised?
-No Data- What is the number of systems impacted?
-No Data- How many users are impacted?
-No Data-

3. Incident Description

Approximate start of incident? When was this incident detected? Timezone 2023-06-15 at 11:00am  2023-06-15 at 11:45am  EST Brief description of the incident Ongoing ransomware attack. Network and personal user information compromised, significant disruption. Incident response team engaged, systems isolated. External experts investigating, data restoration in progress

4. Impact Details

Was the confidentiality, integrity, and/or availability of your organization's information systems potentially compromised?

Yes

What is the number of systems impacted?

12

How many users are impacted?

← Rooms | News | Analytics | Create Rooms

⚙ Support  🔔 Notifications  👤 Jane Doe / Westside Health ▾

Cyber Crisis Response ▾

🗔 Room Overview
📄 Reports
○ Data
📌 Noticeboard
👥 People & Companies

▸ Your Workstreams
▴ Analysis
▴ Containment
▴ Recovery
▸ Crisis Communications
▴ Direct Messages
  👤 Jane Doe ①
  👤 John Doe

Data
Control and manage your incident data

| All Data | Issues (2) | Reports (2) | Shared | Comments (1) | Timeline |

Your data includes company information and facts captured about the current incident

[Filter for data]  📞 🔍 🔍 🔍  From [2023-06-15] To [Now]  [Invite]

Company Information

| Name | Value | Type | Origin | Last Updated | Updated By | History |
|---|---|---|---|---|---|---|
| Company Name | Westside... | Global | Preparation Room | 30 days ago | 👤 | ↺ |
| Sector | Healthcare... | Global | Preparation Room | 30 days ago | 👤 | ↺ |
| Website | www.west... | Global | Preparation Room | 30 days ago | 👤 | ↺ |
| Contact First Name | Hanna | Global | Preparation Room | 30 days ago | 👤 | ↺ |
| Contact Last Name | Walsh | Global | Preparation Room | 30 days ago | 👤 | ↺ |
| Contact Phone Number | +1111111111 | Global | Preparation Room | 30 days ago | 👤 | ↺ |
| Email Address | hanna.wal... | Global | Preparation Room | 30 days ago | 👤 | ↺ |

Incident Details

| Name | Value | Type | Origin | Last Updated | Updated By | History |
|---|---|---|---|---|---|---|
| Severity | SEV-01 | Incident | Details | 1 hour ago | | |
| Start | 202... | Incident | Details | 15 hours ago | | |
| Detected | 202... | Incident | Details | 15 hour ago | | |
| Summary | Ongoing... | Incident | Details | 30 minutes ago | | |

Analysis

| Name | Value | Type | Origin | Last Updated | Updated By | History |
|---|---|---|---|---|---|---|
| Servers Impacted | 12 | Incident | Forensics Analysis | 1 hour ago | | |
| Users Impacted | 31,000 | Incident | Forensics Analysis | 1 hour ago | | |
| Systems Restored | 1 | Incident | Forensics Analysis | 30 Minutes ago | | |
| Users Restored | 250 | Incident | Forensics Analysis | 2 hours ago | | |

History of Data
View history of data
| Value of Data | Update Date | Updated By |
|---|---|---|
| 5 | 2023-06-20 at 11:00am |  |
| 6 | 2023-06-20 at 11:25am |  |
| 10 | 2023-06-20 at 1:01pm |  |
| 12 | 2023-06-20 at 1:15pm |  |
FIG. 32

SYSTEMS FOR SECURELY TRACKING INCIDENT DATA AND AUTOMATICALLY GENERATING DATA INCIDENT REPORTS USING COLLABORATION ROOMS WITH DYNAMIC TENANCY

CROSS-REFERENCE TO RELATED APPLICATIONS

This application is a continuation-in-part application of U.S. application Ser. No. 18/242,211, filed on Sep. 5, 2023, titled "Systems for Securely Tracking Incident Data and Automatically Generating Data Incident Reports Using Collaboration Rooms with Dynamic Tenancy", which is a continuation-in-part application of U.S. application Ser. No. 18/196,967, filed on May 12, 2023, titled "Systems and Methods for Providing Secure Access to Collaboration Rooms with Dynamic Tenancy in Response to an Event", which is a continuation-in-part application of U.S. application Ser. No. 17/939,865, filed on Sep. 7, 2022, titled "Systems and Methods of Entity Control of Collaboration Rooms", which is a continuation of U.S. application Ser. No. 17/476,367, filed on Sep. 15, 2021, now U.S. Pat. No. 11,477,208, titled "Systems and Methods for Providing Collaboration Rooms with Dynamic Tenancy and Role-based Security". This application is also related to U.S. application Ser. No. 16/940,272, filed on Jul. 27, 2020, titled "Cloud-Based Multi-Tenancy Computing Systems and Methods for Providing Response Control and Analytics", which is hereby incorporated by reference herein in its entirety, including all references and appendices cited therein, for all purposes, as if fully set forth herein. This application is related to U.S. application Ser. No. 17/477,384, filed on Sep. 16, 2021, titled "Systems and Methods for Dynamically Establishing and Managing Tenancy Using Templates", which is hereby incorporated by reference herein in its entirety, including all references and appendices cited therein, for all purposes, as if fully set forth herein. All of the aforementioned disclosures are hereby incorporated by reference herein in their entireties, including all references and appendices cited therein, for all purposes, as if fully set forth herein.

FIELD OF THE PRESENT TECHNOLOGY

The present disclosure pertains to systems and methods for securely tracking incident data across three phases of a data incident response including analysis, containment, and recovery, and automatically generating data incident reports.

SUMMARY

Some embodiments of the present disclosure a method including: receiving incident data from a data incident of a tenant, the incident data including data workstreams, facts, and tasks; establishing, via an orchestration service, a digital collaboration room for the tenant in response to the data incident, the tenant having control to grant permissions or access rights to users regarding the digital collaboration room and to dynamically modify the permissions of the users in real-time, the orchestration service being a cloud resource where the digital collaboration room, owned by the tenant, is hosted and made accessible to the users; generating a token for a user that represents the permissions to a user, the generating the token including encoding a tenant identifier, a digital collaboration room identifier, an access right for the user to enter the digital collaboration room, and a secure tenant reporter role for the user, the secure tenant reporter role specifying a first set of permissions that indicate actions that can be performed by the user regarding a data incident report; generating a report template, using the digital collaboration room, the generating the report template including: applying metadata tags to the report template for correlations between the incident data and the first set of permissions; applying the secure tenant reporter role for the user using the token based on the first set of permissions; applying the secure tenant reporter role to the report template; and mapping the data workstreams, the facts, and the tasks of the data incident to the report template; generating an incident report using the report template in the digital collaboration room, the incident report including a plurality of report fields; configuring and managing permissions to the incident report including: configuring and managing permissions of the users to access the report fields of the data incident report based on the permissions of the users; and configuring and managing permissions of the secure tenant reporter role to access the report fields of the data incident report and modify the permissions of the users to access the report fields of the data incident report.

In some aspects, the techniques described herein relate to a method, further including: generating a plurality of incident reports using the report template in the digital collaboration room, the plurality of incident reports; and tracking a plurality of data incident reports, the plurality of data incident reports including the data incident report.

In some aspects, the techniques described herein relate to a method, further including: implementing a first feedback loop for the plurality of data incident reports, the first feedback loop including: automatically surfacing to the users changes to specifications for reporting requirements of the plurality of data incident reports; automatically providing specification resolving recommendations for the specifications for the reporting requirements including specific tasks to resolve the specifications for the reporting requirements; automatically surfacing to the users changes to error notifications of the incident data of the plurality of data incident reports; and automatically providing error resolving recommendations to the error notifications including specific tasks to resolve the error notifications; and automatically updating the plurality of data incident reports based on the first feedback loop.

In some aspects, the techniques described herein relate to a method, further including: implementing a second feedback loop for the plurality of data incident reports, the second feedback loop including: analyzing the incident data based on statutory reporting requirements to determine if the incident data is applicable to the statutory reporting requirements; and automatically mapping and tagging the incident data to reporting data required for the statutory reporting requirements; and automatically updating the plurality of data incident reports based on the second feedback loop.

In some aspects, the techniques described herein relate to a method, wherein the data incident report includes a situational report for an executive team, the situational report for the executive team having hierarchical permissions for access to the plurality of report fields by the executive team.

In some aspects, the techniques described herein relate to a method, wherein the data incident report includes a regulatory report to be shared with third-party entities, the regulatory report to be shared with third-party entities having hierarchical permissions for access to the plurality of report fields by the third-party entities.

In some aspects, the techniques described herein relate to a method, wherein the data incident report includes a customer specific report, the customer specific report having hierarchical permissions for access to the plurality of report fields for customers or vendors.

In some aspects, the techniques described herein relate to a method, wherein the applying metadata tags to the report template for correlations between the incident data and the first set of permissions includes: selecting report tags relevant to the report template; mapping the tenant to the plurality of report fields; applying the report tags for the tenant; and applying the report tags to the plurality of report fields.

In some aspects, the techniques described herein relate to a method, wherein an ability for the grant permissions or access rights to users regarding the digital collaboration room and to dynamically modify the permissions of the users in real-time is enabled by dynamic tenancy and dynamic provision of permissions as implemented by the orchestration service.

In some aspects, the techniques described herein relate to a method, further including: receiving a specific triggering fact; generating a specific report template matching the specific triggering fact in response to the specific triggering fact; and imported into the digital collaboration room the specific report template.

In some aspects, the techniques described herein relate to a method, further including: analyzing the plurality of report fields by comparing the plurality of report fields to report fields required for a report type to determine missing report fields; and automatically creating the missing report fields for the report template.

In some aspects, the techniques described herein relate to a method, further including: displaying, using a user interface, the incident report to a compliance team of the tenant; receiving feedback from the compliance team of the tenant based on the displaying the incident report; and automatically updating the incident report based on the receiving feedback from the compliance team.

In some aspects, the techniques described herein relate to a method, further including transforming the incident report into a format specified in the report template, the transforming the incident report ensuring compliance for regulatory and compliance requirements.

In some aspects, the techniques described herein relate to a method, further including: receiving approval for the incident report from a compliance team; and sending the incident report to a regulatory agency.

In some aspects, the techniques described herein relate to a system including: a processor; and a memory for storing executable instructions that, when executed by the processor, cause the processor to perform a method, the method including: receiving incident data from a data incident of a tenant, the incident data including data workstreams, facts, and tasks; establishing, via an orchestration service, a digital collaboration room for the tenant in response to the data incident, the tenant having control to grant permissions or access rights to users regarding the digital collaboration room and to dynamically modify the permissions of the users in real-time, the orchestration service being a cloud resource where the digital collaboration room, owned by the tenant, is hosted and made accessible to the users; generating a token for a user that represents the permissions to a user, the generating the token including encoding a tenant identifier, a digital collaboration room identifier, an access right for the user to enter the digital collaboration room, and a secure tenant reporter role for the user, the secure tenant reporter role specifying a first set of permissions that indicate actions that can be performed by the user regarding a data incident report; generating a report template, using the digital collaboration room, the generating the report template including: applying metadata tags to the report template for correlations between the incident data and the first set of permissions; applying the secure tenant reporter role for the user using the token based on the first set of permissions; applying the secure tenant reporter role to the report template; and mapping the data workstreams, the facts, and the tasks of the data incident to the report template; generating an incident report using the report template in the digital collaboration room, the incident report including a plurality of report fields; configuring and managing permissions to the incident report including: configuring and managing permissions of the users to access the report fields of the data incident report based on the permissions of the users; and configuring and managing permissions of the secure tenant reporter role to access the report fields of the data incident report and modify the permissions of the users to access the report fields of the data incident report.

In some aspects, the techniques described herein relate to a system, further including: generating a plurality of incident reports using the report template in the digital collaboration room, the plurality of incident reports; and tracking a plurality of data incident reports, the plurality of data incident reports including the data incident report.

In some aspects, the techniques described herein relate to a system, further including: implementing a first feedback loop for the plurality of data incident reports, the first feedback loop including: automatically surfacing to the users changes to specifications for reporting requirements of the plurality of data incident reports; automatically providing specification resolving recommendations for the specifications for the reporting requirements including specific tasks to resolve the specifications for the reporting requirements; automatically surfacing to the users changes to error notifications of the incident data of the plurality of data incident reports; and automatically providing error resolving recommendations to the error notifications including specific tasks to resolve the error notifications; and automatically updating the plurality of data incident reports based on the first feedback loop.

In some aspects, the techniques described herein relate to a system, further including: implementing a second feedback loop for the plurality of data incident reports, the second feedback loop including: analyzing the incident data based on statutory reporting requirements to determine if the incident data is applicable to the statutory reporting requirements; and automatically mapping and tagging the incident data to reporting data required for the statutory reporting requirements; and automatically updating the plurality of data incident reports based on the second feedback loop.

In some aspects, the techniques described herein relate to a system, wherein the data incident report includes a situational report for an executive team, the situational report for the executive team having hierarchical permissions for access to the plurality of report fields by the executive team.

In some aspects, the techniques described herein relate to a system, wherein the data incident report includes a regulatory report to be shared with third-party entities, the regulatory report to be shared with third-party entities having hierarchical permissions for access to the plurality of report fields by the third-party entities.

In some aspects, the techniques described herein relate to a system, wherein the data incident report includes a customer specific report, the customer specific report having hierarchical permissions for access to the plurality of report fields for customers or vendors.

In some aspects, the techniques described herein relate to a system, wherein the applying metadata tags to the report template for correlations between the incident data and the first set of permissions includes: selecting report tags relevant to the report template; mapping the tenant to the plurality of report fields; applying the report tags for the tenant; and applying the report tags to the plurality of report fields.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 13A and FIG. 13B are a flowchart of an example method of the present disclosure of managing incident report templates, according to various embodiments.

FIG. 15A, FIG. 15B, and FIG. 15C are a flowchart of an example method of the present disclosure related to managing incident reports, according to various embodiments.

FIG. 17A and FIG. 17B are a flowchart of an example method of the present disclosure related to managing and automatically generating incident reports including transforming incident data, according to various embodiments.

FIG. 18A, FIG. 18B, FIG. 19, FIG. 20, FIG. 21, FIG. 22A, FIG. 22B, FIG. 23, FIG. 24A, FIG. 24B, FIG. 25, FIG. 26A, FIG. 26B, FIG. 27A, FIG. 27B, FIG. 28, FIG. 29A, FIG. 29B, FIG. 30A, FIG. 30B, FIG. 31, and FIG. 32 are user interfaces for managing and automatically generating incident reports, according to various embodiments of the present technology.

DETAILED DESCRIPTION

Overview

Figure 1:
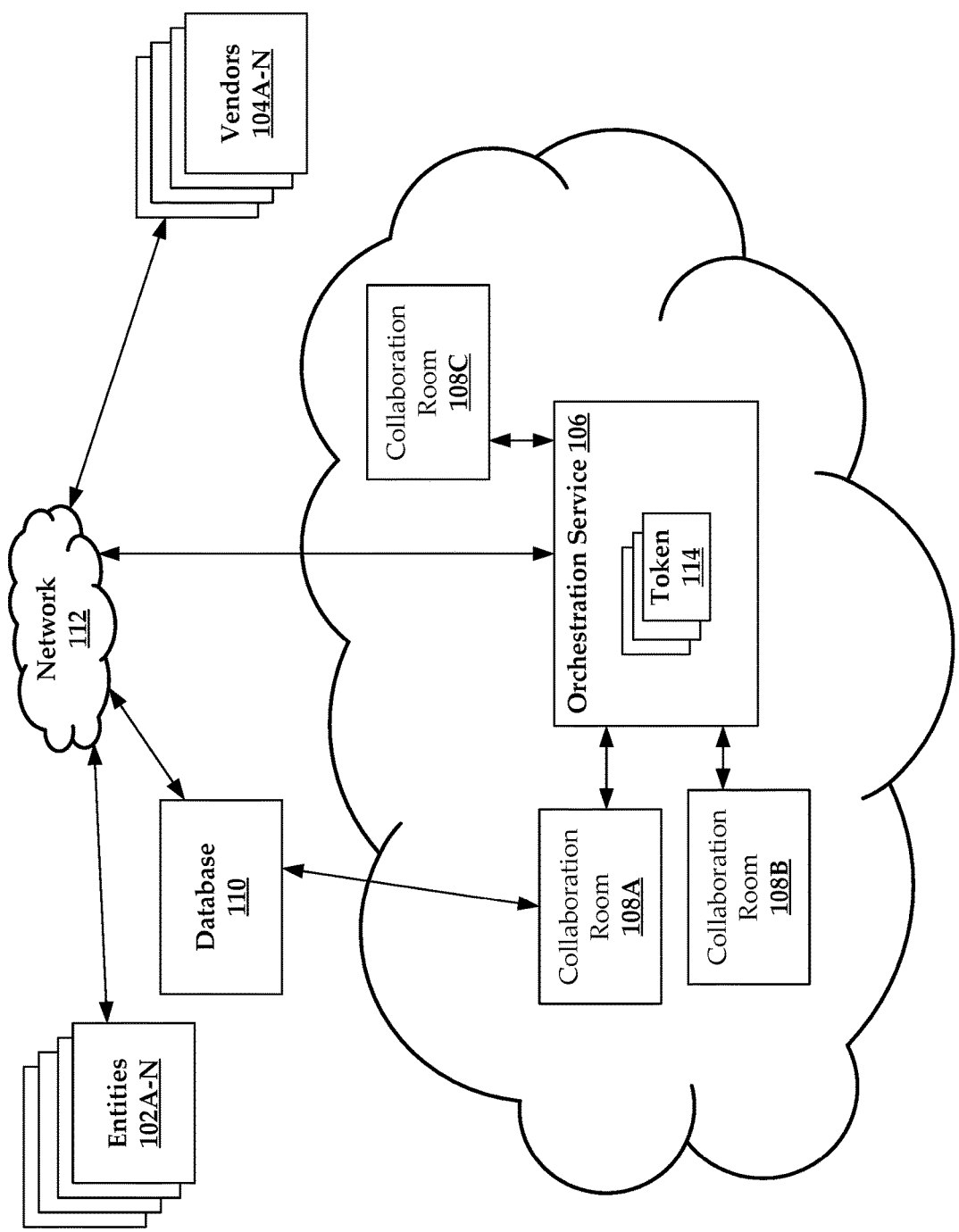
FIG. 1 depicts an example architecture where the systems and methods of the present disclosure can be implemented, according to various embodiments.

Broadly, the present disclosure is directed to systems and methods for establishing and managing digital collaboration rooms. A plurality of digital collaboration rooms can be established for a plurality of entities, such as companies. A collaboration room can be established to allow users to access data pertaining to an event, such as a lawsuit or a data breach. Users may be associated with the entity or a vendor who may assist the entity with respect to the event. For example, a vendor can include a law firm, a lawyer, privacy counsel, technology consulting, credit monitoring, brokers, public relations, insurance, and notification services—just to name a few. While some embodiments involve creating a collaboration room or other similar virtual collaboration environment based on an event, such spaces can be created for purposes of group collaboration without being connected to or initiated by an event.

The systems and methods provide an orchestration service where entities can maintain collaboration rooms. The orchestration service can also include vendor accounts or profiles. Entities can select vendors to invite to their collaboration room(s). Vendors can access the collaboration room(s) of one or more entities through the orchestration service, and access data depending on their particular permissions or rights granted to them by the entity.

In some instances, many users may need to access data inside the collaboration room and each of these users may have different permissions with respect to the data. The systems and methods can maintain roles that specify the permissions for each user. In one embodiment, the permissions can be modified, resulting in real-time or near-real-time changes to the role of the user. Indeed, the entity is provided with complete control of users that are allowed to enter the collaboration room, as well as what actions the users are allowed to perform on the data inside the collaboration room. In some instances, the permissions for the user, as well as what collaboration rooms they can enter can be encoded into a token.

The systems and methods can perform a hierarchical permissions analysis as users request actions within a collaboration room. In some instances, each time a user performs an action inside the collaboration room, such as refreshing, view, edit, delete, or other similar actions, a hierarchical permissions analysis is executed to determine if the user has permission to perform the requested action, as well as if the user has access rights to be in the collaboration room. This hierarchical permissions analysis can be used to effectuate the dynamic tenancy aspects disclosed herein, as will be discussed in greater detail herein.

Also, in some configurations, the systems and methods may obtain data from a database and allow actions to be performed on the data inside the collaboration room. These data are not maintained in a cache or preserved locally. Thus, access to the data is controlled and actions can only be performed on the data in the collaboration room by an authorized user.

Example Embodiments

FIG. 1 illustrates an example architecture where aspects of the present disclosure can be performed. The architecture may include a plurality of entities, such as entities 102A-N, a plurality of vendors, such as vendors 104A-N, and an orchestration service 106. These components can communicate with one another over a network 112. In general, the architecture creates a global network of users, both entity-related and vendor-related, who can access digital collaboration rooms. Vendors or service providers can publish service-related information. The orchestration service can allow the vendors to be selectable by the plurality of entities.

The entities can also request the creation of collaboration rooms. For example, entity 102A can establish collaboration rooms 108A and 108B, while another entity can establish collaboration room 108C. Entities can control when and how vendors access these collaboration rooms, as well as what kinds of actions the users can perform against data obtained from a database 110. As will be discussed herein, data can be pulled from the database 110 on an as-needed basis. In some embodiments, data does not persist in a collaboration room beyond a session with one or more vendors.

The network 112 can include combinations of networks that enable the components in the architecture to communicate with one another. The network 112 may include any one or a combination of multiple different types of networks, such as cellular, cable, the Internet, wireless networks, and other private and/or public networks. In some instances, the network 112 may include Wi-Fi or Wi-Fi direct. The network 112 can include short-range or radiofrequency links such as BLUETOOTH or ultra-wideband (UWB).

The orchestration service 106 can allow an entity to establish a collaboration room. The digital collaboration room can be configured to allow users to perform actions on data obtained from a database and placed into the digital collaboration room. For example, entity 102A can establish collaboration rooms 108A and 108B, where collaboration room 108A pertains to a first event, such as a cybersecurity breach, and collaboration room 108B, which pertains to a ransomware event. In general, collaboration rooms can be created in response to an incident or event (although in some instances rooms are not created in response to an event, but simply to allow users to collaborate). The orchestration service 106 can assign each entity a tenant identifier. The orchestration service 106 can assign each collaboration room a digital collaboration room identifier.

There are two types of users on the entity side (additional roles can also be specified). For example, entity users can have an administrator role or a participant role. These users are typically employees who help the entity navigate an event. The entity can invite any of the vendors to access a particular collaboration room.

When an entity chooses a vendor from the global network of users, the orchestration service 106 can generate a token 114 for the vendor user. The token 114 can embed a set of long-lived credentials that allow a user to perform an action on data with respect to a tenant (specified by a tenant ID), for a particular collaboration room (specified by a digital collaboration room ID). By long-lived, this means that privileges/permissions can persist until revoked by a user who has the right to revoke permissions. It will be understood that some privileges or credentials can be short-lived as well. For example, some privileges or credentials can be set to expire after a period of time or after a certain number of uses. A user could be allowed to view a document a set number of times, or until the expiration of a date in the future.

Also, when vendor users have been granted access to collaboration rooms of various entities, the orchestration service 106 can allow vendors to enter and exit collaboration rooms as needed. The orchestration service 106 effectively functions as a cloud resource where collaboration rooms, owned by entities, can be hosted and made accessible to vendors.

The token 114 can include any one or more of a tenant identifier, a digital collaboration room identifier, an access right for the user to enter the digital collaboration room, and a role for the user. Generally speaking, the role specifies a set of permissions that indicate actions that can be performed by the user within the collaboration room. For example, a user who is a lawyer may be given a first set of permissions, whereas an insurance broker may be given a second set of permissions. The lawyer may be allowed to access and view any type of document, while the insurance broker may be allowed to access and view only data related to an insurance claim.

While some examples include roles that can be assigned on an individual user level, the orchestration service 106 also allows for the creation of higher-level user roles. For example, a general law firm role can be established which allows any user in the law firm to perform certain actions in the collaboration room.

The orchestration service 106 allows entities to specify what permissions are created for given roles. For example, a lawyer role can include a role with a set of permissions that allows the user to view all data, as well as other actions such as edit, delete, move, and so forth. Again, the orchestration service 106 allows actions to be performed on data placed in a collaboration room. The actions can include, but are not limited to read, view, write, filter, edit, and so forth. For each action, there is a specific and defined permission that can be grated and encoded into a token for the user. In some instances, the permissions are selected by an administrative user of the entity which owns the digital collaboration room.

Additionally, the orchestration service 106 can allow entity administrator users the ability to set visibility of actions within the collaboration room. For example, the administrator may allow all users to see all actions that can be conducted in the collaboration room. In another embodiment, only users internal to an entity can view the actions that are available in the collaboration room. In yet another example, only people listed in a lead of the user section may be allowed to view actions in the collaboration room. For example, a head lawyer or technical specialist may be allowed to view actions, while others on their team may not. In sum, a user may have all or limited view into actions available in the collaboration room.

In some instances, the orchestration service 106 can email a requested vendor a link. The user can click the link to enter the digital collaboration room. For example, the vendor 104A can enter the collaboration room 108A of entity 102A. The orchestration service 106 can evaluate the token of the user to determine if they have permission to enter the collaboration room 108A. In some instances, the token can be linked to a session policy for the user. That is, the actions of the user can be managed on a session-by-session basis.

Once the user enters collaboration room 108A, the user can perform an action on data obtained from the database 110. For example, the vendor may request to view emails regarding a particular topic. In some instances, the orchestration service 106 can provide a query interface where the vendor can query for documents or other data using drop-down boxes, fields, or other input mechanisms.

If there are data responsive to the query, these data can be obtained from the database 110 and made available in the collaboration room 108A. The user can then be allowed to perform one or more actions against the data, assuming the user has permissions for such actions. Thus, the orchestration service 106 can be configured to receive a request to perform an action on a portion of the data. That is, in some instances, the user can perform an action on all or a portion of the data included in the database 110.

The orchestration service 106 can maintain dynamic tenancy within the architecture. Dynamic tenancy allows for the permissions/role of a user to be updated at any time and to have these modifications to the permissions/role become effective in real-time or near-real-time. These changes in permissions/role for a user can occur even in instances where the user is active in the collaboration room. An administrator user for an entity can change the permissions for a vendor user at any time. For example, the permissions/role for a lawyer can be changed. The permissions may initially allow the lawyer to access all data/documents for the entity related to the incident or event associated with the collaboration room. Changes in these permissions may result in the lawyer being allowed to access only a portion of the data due to an identified conflict. In another example, a lawyer can be completely excluded as well, based on an identified conflict. While examples herein contemplate the entity having administrators that can change permissions, some vendor roles may also be allowed to edit permissions for subordinate vendor users. For example, a managing partner of a law firm can manage permissions assigned to individual lawyers in their firm.

As noted above, these permissions can be changed and effectuated in real-time. By way of example, when a user is in the collaboration room viewing documents, the user's permissions to view certain documents may be revoked. When the user attempts to refresh their view or open a document, the user will be blocked when the requested documents are in the portion of the data for which the permissions of the user have been revoked. The user can continue to operate in the collaboration room and perform other actions for which they have permission.

In some instances, the orchestration service 106 enables aspects of dynamic tenancy by performing continual permissions checks or analyses on users in the collaboration room. The orchestration service 106 can perform permissions checks any time a user performs or requests the performance of an action in the collaboration room. This can include actions such as refreshing a view of the collaboration room. In general, any behavior of a user in a collaboration room can be considered an action. Thus, an action is requested each time the user performs a refresh of the data in the digital collaboration room, or other similar actions.

For example, a user currently viewing a document may have their permission to view that document revoked. If the user refreshes their view or requests an action related to the document, access to that document can be revoked such that the user can no longer view or perform actions against that document. Again, as noted above, this can occur on a session-by-session basis, where permissions can be authorized for a session, and the permissions are rechecked in a subsequent session. Changes between sessions to the permissions can result in an alteration of user rights. In sum, an entity user or other authorized user can change the set of permissions which dynamically changes the role of the user, at any time.

To enable this dynamic tenancy and dynamic provision of permissions, the orchestration service 106 can be configured to perform a hierarchical permissions analysis. The hierarchical permissions analysis is a bottom-to-top permissions analysis that determines user who has requested an action has the requisite permission or right to perform the requested action. In some instances, the user can submit a request that requires more than one action. For example, a request to edit a document may include initially a request to obtain the document from the database, along with another request to allow the user to view the document, and finally a request to edit the document. Each of these requests may have a first permission associated therewith. The request to obtain could have a first permission, the request to view have a second permission, and the request to edit may have a third permission. In general, the third permission can depend on the user having the second permission, and the second permission can depend on the user having the first permission. This creates what is referred to as a dependency ordering of one or more actions.

Figure 2:
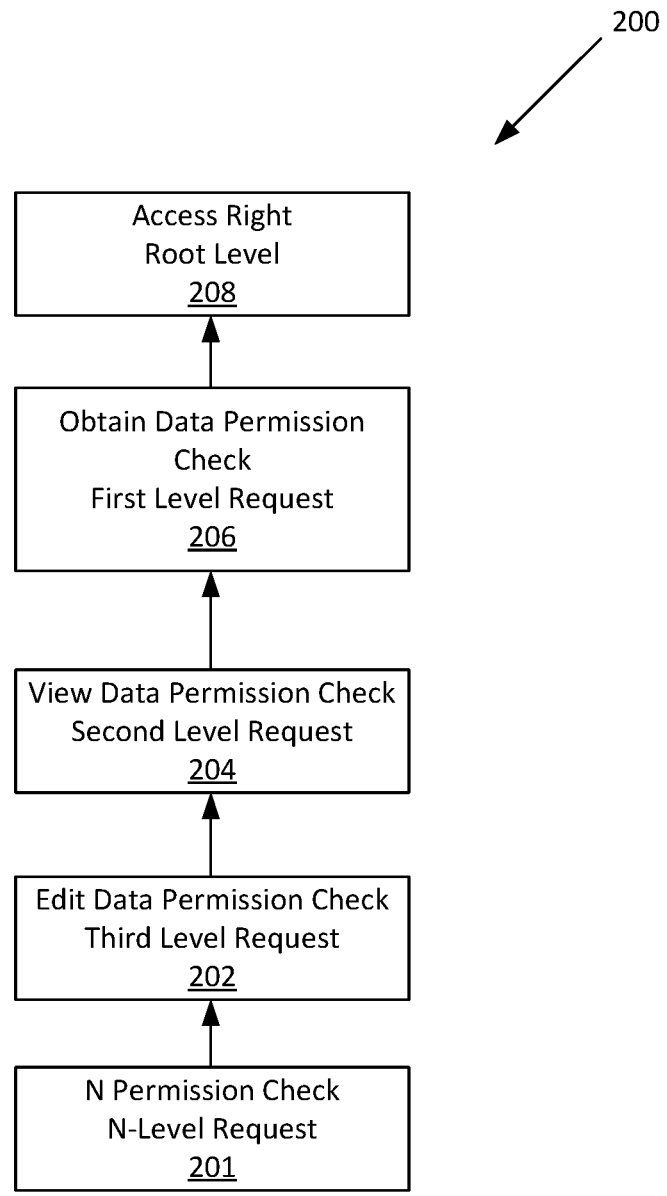
FIG. 2 illustrates an example tree structure for use in a hierarchical permissions analysis, according to various embodiments.

Referring now to FIGS. 1 and 2 collectively, generally, when more than one action is requested in a session, the actions can be considered as a tree structure 200. In one example, each of the one or more actions can be arranged into branches of a tree structure based on the dependency ordering. A third action would be on bottom level 202 of the tree structure, with the second action on a second level 204 above the third level, and the first action on a first level 206 above the second. A root level 208 of the tree structure can be the access right to the digital collaboration room. In general, each of the one or more actions are arranged into branches of a tree structure based on the dependency ordering, with the access right to the digital collaboration room being a root of the tree structure. While three levels have been shown, any N-number of levels of requests and permissions checks can be present (see 201 of FIG. 2).

In one example, an action or transaction can include either a read or write operation. To write, a user should possess permission to read and/or write from the bottom to the top of a tree structure. To read, a user should possess permission to read from the bottom to the top of a tree structure.

The orchestration service 106 can be configured to determine a dependency ordering of one or more actions related to the data. The hierarchical permissions analysis can include determining if the user has permission to perform each of the one or more actions, in a bottom-to-top manner based on the dependency ordering. Thus, when the user requests the third action of editing the document, the orchestration service 106 can determine if the user has permission to edit the document. Also, the orchestration service 106 also determines if the user has permission to view the document (second action), as well as permission to obtain the document (first permission). Finally, the orchestration service 106 also determines if the user currently has permission to enter the digital collaboration room.

These permissions checks occur in a layered fashion as well. For example, the user may first request only to obtain the document. A permissions check is then performed to ensure the user has the right to obtain the document. When the user then requests to open/view the document, the orchestration service 106 not only determines if they have permission to open/view the document, but the orchestration service 106 can again verify that the user has permission to obtain the document. The orchestration service 106 can also verify that the user currently has rights to be in the collaboration room at each separate permissions check. Thus, the orchestration service 106 can iteratively and/or recursively check for permissions at each level of the dependency ordering.

Again, these permissions checks are performed by the orchestration service 106 to ensure that none of the permissions have changed or been modified. For example, if the right of the user has been revoked to view the document, the user also cannot be allowed to edit the document. If the right of the user has been revoked to obtain the document, the user also cannot be allowed to view or edit the document. It will be understood that the user may still have rights to enter the digital collaboration room and conduct other actions. However, if the access rights of the user to enter the collaboration room have been revoked, the user can perform no actions.

The orchestration service 106 can deny access to all or a portion of the data when the role has been altered and the first user no longer has rights to perform the action. The orchestration service 106 can deny access to perform the action on the data when a permission of a set of permissions has been revoked but the user currently has permission to be in the digital collaboration room. In this example, the user can still be in the collaboration room and potentially be assigned other permissions. As noted above, this hierarchical permissions analysis can be executed each time a user performs any action inside the collaboration room. Also, the hierarchical permissions analysis is performed against the permissions in the token for the user. That is, the orchestration service 106 can convert the permissions into a set of rules that are run over data pulled from the database 110.

Assuming the user request passes the hierarchical permissions analysis, the orchestration service 106 can obtain data from a database and allow the one or more requested actions to be performed on the data.

In some embodiments, a tenant can be associated with one or more vaults (e.g., databases) that store data that can be used in a collaboration. A user can be associated with the tenant. The user can have a specified role, such as a provider/vendor role, a provider/administrator role, and/or a client role. These roles pertain to a collaboration room. A user can have vault roles as well, such as administrator role, a user role, and/or a vendor role. Thus, multiple users can have access to data in the vault. Each user can be allowed to perform one or more actions in a collaboration room related to data obtained from the vault inside the collaboration room.

A task can have n-number of associated tasks, messages, and/or facts. The user and data can have one or more visibility rules applied thereto. Example visibility rules can include, but are not limited to, allowing all users in the collaboration room to view data obtained from the vault, only allowing users internal to the entity to view data, and/or custom confidential users or organizations which can be explicitly added.

Figure 3:
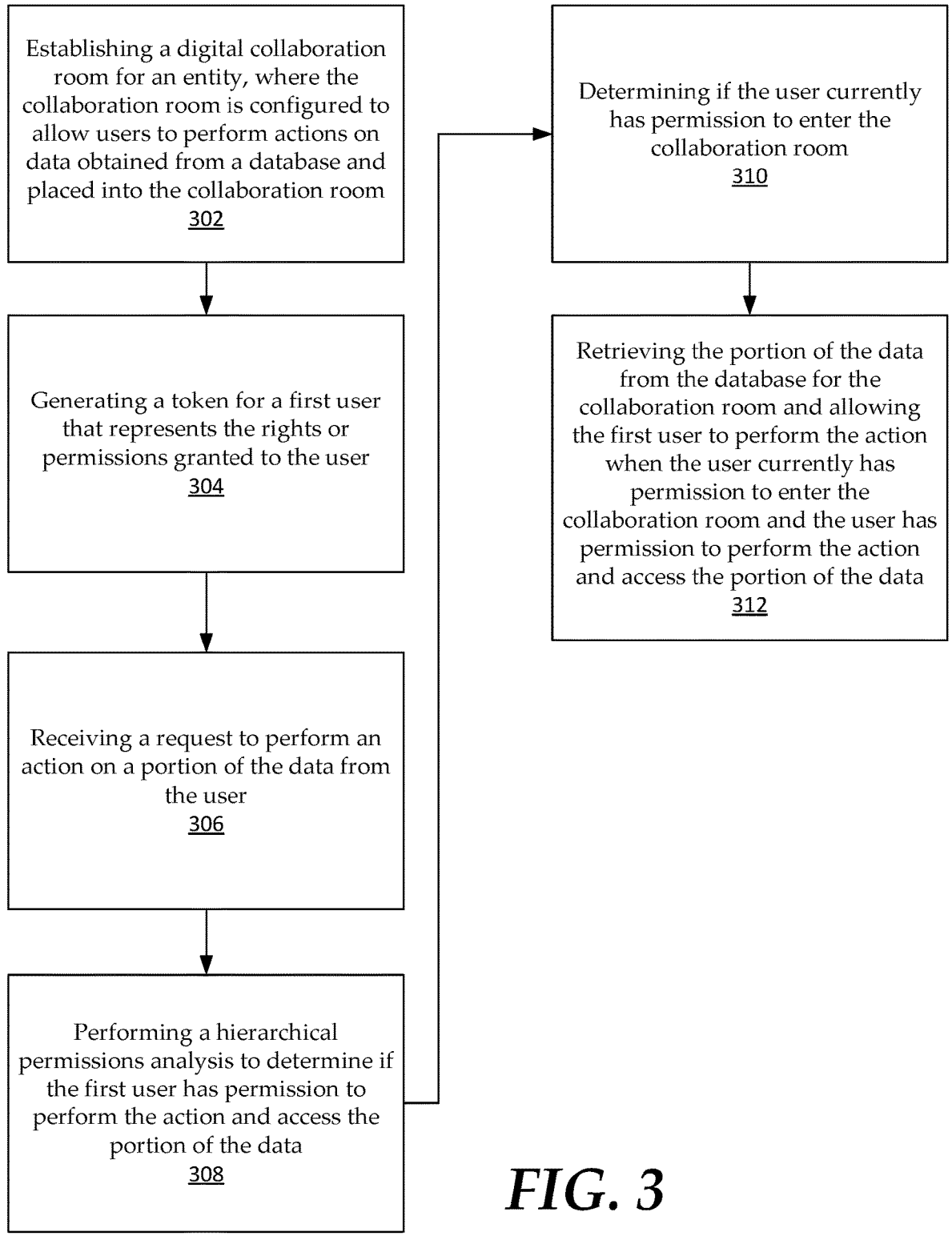
FIG. 3 is a flowchart of an example method of the present disclosure, according to various embodiments.

FIG. 3 is a flowchart of an example method of the present disclosure. The method can include a step 302 of establishing a digital collaboration room for an entity, where the digital collaboration room being configured to allow users to perform actions on data obtained from a database and placed into the digital collaboration room. In some instances, the entity and collaboration room are each given a unique ID.

Next, the method includes a step 304 of generating a token for a first user that represents the rights or permissions granted to the user. Generating the token may include encoding a tenant identifier, a digital collaboration room identifier, an access right for the first user to enter the digital collaboration room, and a role for the first user. To be sure, the role specifies a first set of permissions that indicate actions that can be performed by the first user.

Steps 302 and 304 can be performed for additional users. That is, a plurality of users can be granted tokens and corresponding permissions related to the collaboration room.

The method can include a step 306 of receiving a request to perform an action on a portion of the data from the user. For example, the user can submit a query to identify documents that are relevant to one or more keywords.

The method also includes a step 308 of performing a hierarchical permissions analysis to determine if the first user has permission to perform the action and access the portion of the data. The hierarchical permissions analysis can also include a step 310 of determining if the user currently has permission to enter the digital collaboration room. As noted above, this can include evaluating an access right included in the token for the user.

Assuming that the permissions analysis is successful, the method can include a step 312 of retrieving the portion of the data from the database for the digital collaboration room and allowing the first user to perform the action when the user currently has permission to enter the digital collaboration room and the user has permission to perform the action and access the portion of the data. If the permissions analysis is unsuccessful, the user can be presented with a message informing them that they lack permission to perform the requested action.

In some instances, the method can include specifying a role for the first user that includes a first set of permissions. The method can also include altering the first set of permissions and denying access to the portion of the data when the role has been altered and the first user no longer has rights to perform the action. Access to perform the action on the portion of the data can also be denied when a permission of the first set of permissions to perform the action has been revoked but the user currently has permission to be in the digital collaboration room. Thus, the access right may be intact and granted while permissions for dependent actions may be active or revoked.

Figure 4:
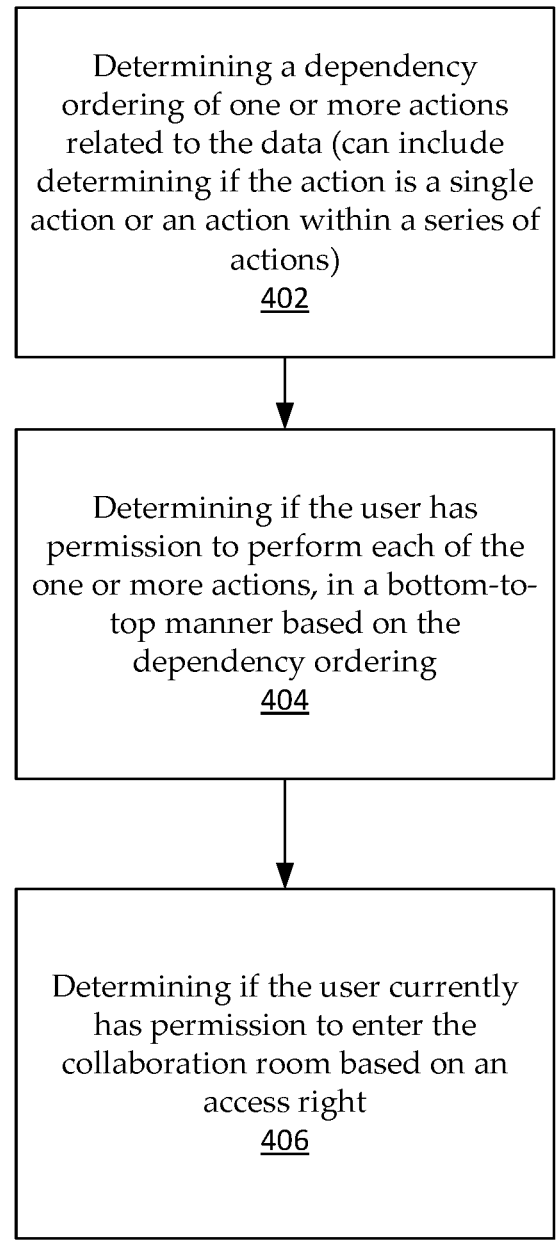
FIG. 4 is a flowchart of an example method of the present disclosure related to an example hierarchical permissions analysis, according to various embodiments.

FIG. 4 is a flowchart of another example method for performing a hierarchical permissions analysis that includes a step 402 of determining a dependency ordering of one or more actions related to the data. This can include determining if the action is a single action or an action within a series of actions. When more than one action is occurring or has been requested, the method can include a step 404 of determining if the user has permission to perform each of the one or more actions, in a bottom-to-top manner (e.g., iteratively or recursively) based on the dependency ordering. Next, the method includes a step 406 of determining if the user currently has permission to enter the digital collaboration room based on an access right.

Figure 5:
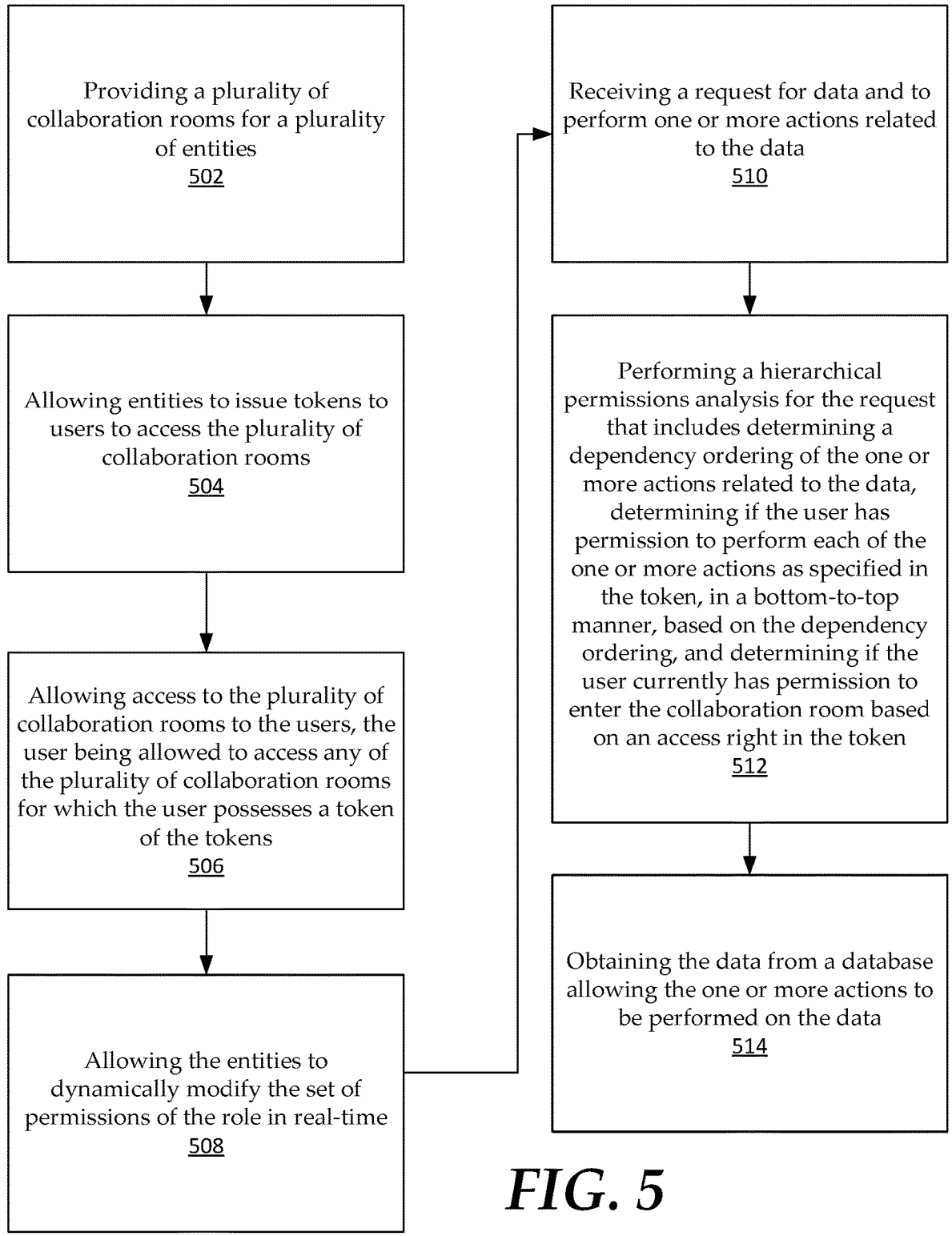
FIG. 5 is a flowchart of an example method of the present disclosure, according to various embodiments, according to various embodiments.

FIG. 5 is a flowchart of another example method of the present disclosure. The method can include a step 502 of providing a plurality of digital collaboration rooms for a plurality of entities. The method can also include a step 504 of allowing entities to issue tokens to users to access the plurality of digital collaboration rooms. Each user has been issued one of the tokens and each of the tokens comprises a tenant identifier that identifies one of the plurality of entities, a digital collaboration room identifier, and a role with a set of permissions.

The method includes a step 506 of allowing access to the plurality of digital collaboration rooms to the users, the user being allowed to access any of the plurality of digital collaboration rooms for which the user possesses a token of the tokens. Next, the method includes a step 508 of allowing the entities to dynamically modify the set of permissions of the role in real-time, as well as a step 510 of receiving a request for data and to perform one or more actions related to the data.

In some instances, the method can include a step 512 of performing a hierarchical permissions analysis for the request that includes determining a dependency ordering of the one or more actions related to the data, determining if the user has permission to perform each of the one or more actions as specified in the token, in a bottom-to-top manner, based on the dependency ordering, and determining if the user currently has permission to enter the digital collaboration room based on an access right in the token. Based on success of the hierarchical permissions analysis, the method includes a step 514 of obtaining the data from a database allowing the one or more actions to be performed on the data.

Figure 6:
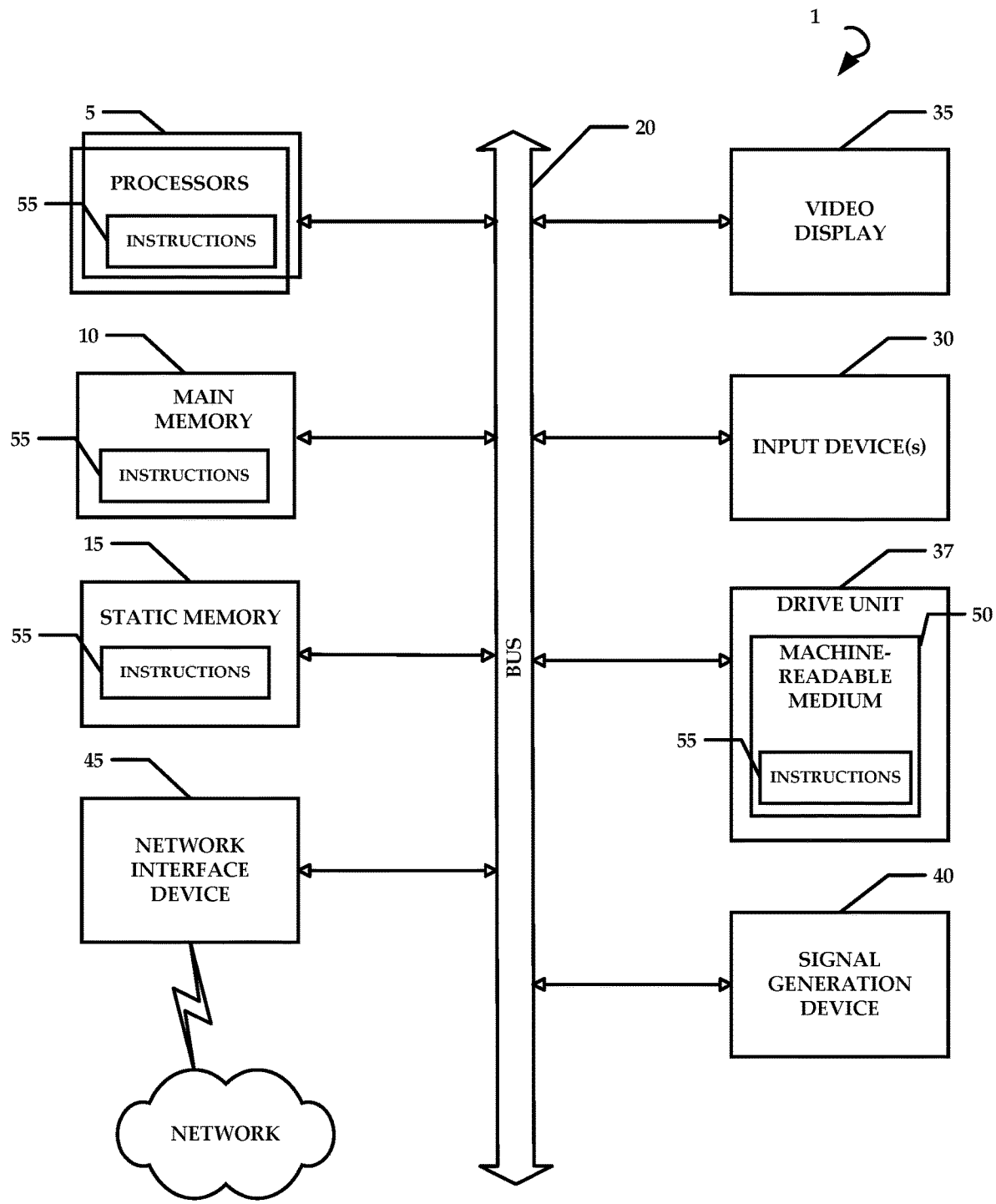
FIG. 6 is a schematic diagram of a computing system that is used to implement embodiments according to the present technology, according to various embodiments.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are well known in the art. Thus, the computer system 1 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described herein, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

Isolate Mode

As previously described, the present disclosure provides systems and methods for providing secure access to collaborations rooms with dynamic tenancy, even during or following an event or a crisis. As described above, a collaboration room can be established to allow users to access data pertaining to an event, such as a lawsuit or a data breach. Users may be associated with the entity or a vendor who may assist the entity with respect to the event. For example, a vendor (also at times called a "vendor user") can include a law firm, a lawyer, privacy counsel, technology consulting, credit monitoring, brokers, public relations, insurance, and notification services—just to name a few. Also, as mentioned earlier herein, at least two roles of users on the entity side. The entity user can have an administrator role or a participant role. These entity users are typically employees who help the entity navigate an event.

Broadly speaking, when an entity (such as a company) is not experiencing an event (e.g., a cyberattack, a cyber incident, or any other type of adverse issue or crisis), the entity is considered to be in normal operations or in the period of "peace time", since the entity is not embattled, and the entity is not dealing with outside adverse situations or attackers who wish to wrongfully gain access to the entity. During this period of peace time, the entity tenant typically wants to integrate all of their enterprise pieces and tools that are within their entity ecosystem to their corporate tools, thereby allowing the entity's users to have access to the entity's corporate tools via their corporate work email.

As described above, the entity can have entity users (such as company employees, administrators, and the like) and vendor users. Entity users can gain access to the entity's corporate tools by logging into their work email. By using integrations to couple an entity's enterprise pieces and corporate tools with each other, within the entity ecosystem, such corporate tools may automatically be provisioned and de-provisioned for users. Thus, the entity may invite the entity users to gain access to the entity's corporate tools by way of their corporate or company work email.

However, during or following an event or crisis, the entity is considered to be in "war time," since the entity is actively defending itself and/or the entity is aggressively working to address the event and return to normal operations (that is, return to "peace time"). In other embodiments, the entity is considered to be in "war time" if the entity is running a simulation or having a practice or training session using the platform including the orchestration service and/or the digital collaboration room of the entity. After an event occurs, if the entity meets its goal to integrate all the enterprise pieces with its corporate tools, such an integration may become a liability, especially in the case where the corporate email of the entity is compromised. If the entity's corporate email is compromised, then an attacker (that started the event) can spread their unwanted influence over the entity's various corporate tools. For instance, a hacker engaged in a cyber-attack against the entity may hack into the corporate email or may attempt to gain access to the entity's secure place (such as the entity's digital collaboration room) during a cyber incident by using a "forgot password" flow. In other words, the hacker will pose as an entity user (such as an employee) and try to infiltrate the entity's secure place of data, by trying to log into the entity through the corporate email but indicating upon login that they "forgot" their username and/or password by clicking on a "forgot password" button and the like. Thus, the present disclosure is flexible and responsive, regardless of whether the entity is in "peace time"/normal operations or is engaged in "warfare," during or after an event or crisis, such as a cyberattack, a fire, a cyber incident, a data breach, and the like. When the entity/tenant is in "peace time," the present disclosure allows for user access and registration of users, so that the users may seamlessly access an entity's collaboration rooms with dynamic tenancy. During user registration, the system gathers at least three authentication factors for each user.

Authentication factors include, but are not limited to, push notifications to registered devices, software tokens, hardware tokens, recovery codes, passkeys and the like. In exemplary embodiments, the three authentication factors for a user are: (1) the user's corporate email address and password for accessing the entity (sometimes referred to as a first authentication factor); (2) the user's backup email address (sometimes referred to as a second authentication factor); and (3) multifactor authentication (sometimes referred to as a third authentication factor). It will be understood, however, that any type of authentication factor can be used, and that this disclosure is not limited to merely the authentication factors listed herein. In other exemplary embodiments, the second authentication factor includes a phone number of the user (which may be their work phone number or the number of the user's mobile phone) as a primary second authentication factor, as well as the user's backup email which the user may have entered with the orchestration service during the registration process as an alternate second authentication factor in case the phone number of the user fails or is compromised. If the user's backup email is used an alternate second authentication factor, then an email may be generated by the orchestration service and sent to the user's backup email account to indicate when the first authentication factor has been invalidated, instead of sending a text message to the user's phone or mobile number.

The multifactor authentication may require the use of a user's mobile phone number and/or multifactor authentication application. As an example, the multifactor authentication can be a means of authenticating a user by having the user enter a secret code (such as alphanumeric code or a pin number) that is dynamically generated by the multifactor authentication application associated with the entity user's mobile device, so that the user can login to the entity and/or the digital collaboration room using the secret code. Another example is that the multifactor authentication can be a means of authenticating a user by having the user enter a secret code (such as alphanumeric code or a pin number) that is dynamically generated by the multifactor authentication application associated with the entity user's mobile device, so that the user can login their backup email address (which is the second authentication factor) in order to retrieve an email or message generated by the orchestration service, and link on a link in the email or message, in order to gain access to the entity's digital collaboration room.

Also, the present disclosure allows for systems and methods for providing secure access to a digital collaboration room with dynamic tenancy to a user during "war time" or following an event, by completely isolating or separating the system (including, but not limited to the orchestration service and/or the digital collaboration rooms) from the rest of the ecosystem of the entity's corporate tools, as will be described in further detail below. When this isolation occurs, typically triggered by the entity and/or the entity's trusted vendors (as will be described later herein), the orchestration service and/or the digital collaboration rooms are said to be in an "isolate mode." Thus, the systems and methods provided herein provides more security and flexibility in comparison to traditional systems and methods. Furthermore, these system and methods of invalidating the first authentication factor and guiding users to the better, more secure pathway reduces the likelihood that the user will experience confusion, frustration and/or anxiety when the isolate mode has been activated.

Furthermore, the isolate mode for an entity can be activated by either the entity itself at the tenant level or a vendor or trusted partner of the entity. If the entity enables the isolate mode, the entity can do so by communicating this command to the orchestration service. It should be noted that typically, an entity user (like an employee) cannot activate the isolate mode; instead, the isolate mode must be activated by either the entity itself at the entity level (sometimes referred to as the account level or the tenant level) or by one of the entity's vendor/trusted partners. That is, the vendor/trusted partner (like insurance carriers providing fire insurance, attorneys assisting the entity during cyber crisis, or forensic specialists) can activate the isolate mode of the system on behalf of the entity. The vendor/trusted partner can enable or activate the isolate mode of the system, by leveraging and reaching out over the multitenant system to do so. In other words, the vendor user's ability to submit the entity's request to activate the isolate mode is enabled by the dynamic tenancy and dynamic provision of permissions as implemented by the orchestration service, as described earlier herein.

In other embodiments, the entity grants permissions to its entity users (such as an employee) to activate the isolate mode on behalf of the entity. If such permission is granted, an entity user can communicate the command to activate the isolate mode on behalf of the entity to the orchestration service. In those cases, if the entity grants permission to its entity users to submit the entity's request on behalf of the entity, the entity user's ability to submit the entity's request to activate the isolate mode is enabled by the dynamic tenancy and dynamic provision of permissions as implemented by the orchestration service.

However, the entity may only allow account owners in the entity to disable the isolate mode of the entity. In other words, vendors and entity users (such as employees) generally cannot disable the isolate mode of the entity, as the entity has not granted such permissions to vendors and the entity users.

There may be a number of situations when the entity and its entity users may not be able to activate the isolate mode (i.e., they may not be able to "pull" the alarm or lever, following the event or cyberattack) by itself. For instance, in some instances, the entity may not have access to the orchestration service or the digital collaboration room. Other times, the entity lack the maturity, awareness, or knowledge of the event, that is needed to activate the isolate mode. When an entity and the entity users cannot or will not activate the isolate mode, for whatever reason, the orchestration service allows for the entity's vendor/trusted partner to "pull" the alarm and trigger or activate the isolate mode on behalf of the entity. When the isolate mode is enabled, all integrations and efforts to integrate or otherwise couple with the orchestration service and/or the digital collaboration rooms are severed on multiple levels, and any efforts or attempts of integration made, after the isolate mode is activated, are blocked.

The present disclosure further provides a mechanism for invalidating a previously accepted authentication factor and guiding a user to more secure pathway by using a different authentication factor of handshake. In some embodiments, the present disclosure invalidates a previously valid or previously accepted authentication factor that the user is familiar with using, such as the entity's corporate email (usually in the form of typing in a username and password to access the employee's corporate email). Instead of providing access to the entity's collaboration room via an entity user's corporate email address and password, the system reroutes the entity user to a known backup state using a valid authentication factor or handshake. By invalidating the first authentication factor of using the corporate email, the system ensures that all communications between the entity and its users, through a potentially compromised or hacked corporate email server, is stopped altogether.

Also, it should be noted that since the orchestration service began with receiving and storing three authentication factors for each user, typically upon registration, once an event or crisis occurs, the orchestration service can invalidate one of the three authentication factors, and the orchestration service is still left with two valid authentication factors for each user.

As an example, once an event occurs, because the isolate mode has been activated (that is, the isolate mode is "on"), the user is not automatically blocked. Instead, the user is notified that they can no longer use their corporate email to login to access the entity and the entity's corporate tools and the entity user is rerouted to another pathway. In other words, the orchestration service will try to actively handle the user experience of being rerouted to another pathway.

If the entity user tries logging in using their work email, then the orchestration service will generate a text message or some other communication to the user's mobile phone number, asking the user to login using their backup personal email address (which has been previously registered with the system as the second authentication factor) and a third authentication factor. The orchestration service may provide the user with a hint, as part its text message to the user's mobile phone number, as to what is the user's backup email address that the user provided to the system during the initial registration process. Thus, the orchestration service reroutes the entity user to a better, more secure pathway for gaining access to the entity and the entity's corporate tools. The orchestration service will send an email to the user's backup email account, and the email sent will include an actual login link to the entity. Upon retrieving the system's email using their backup email account, the user can then click on the login link that was sent by the system, and gain access to the digital collaboration room, even though the isolate mode has been enabled. In some embodiments, the orchestration service can evaluate the token of the user to determine if they have permission to enter the collaboration room.

Figure 7:
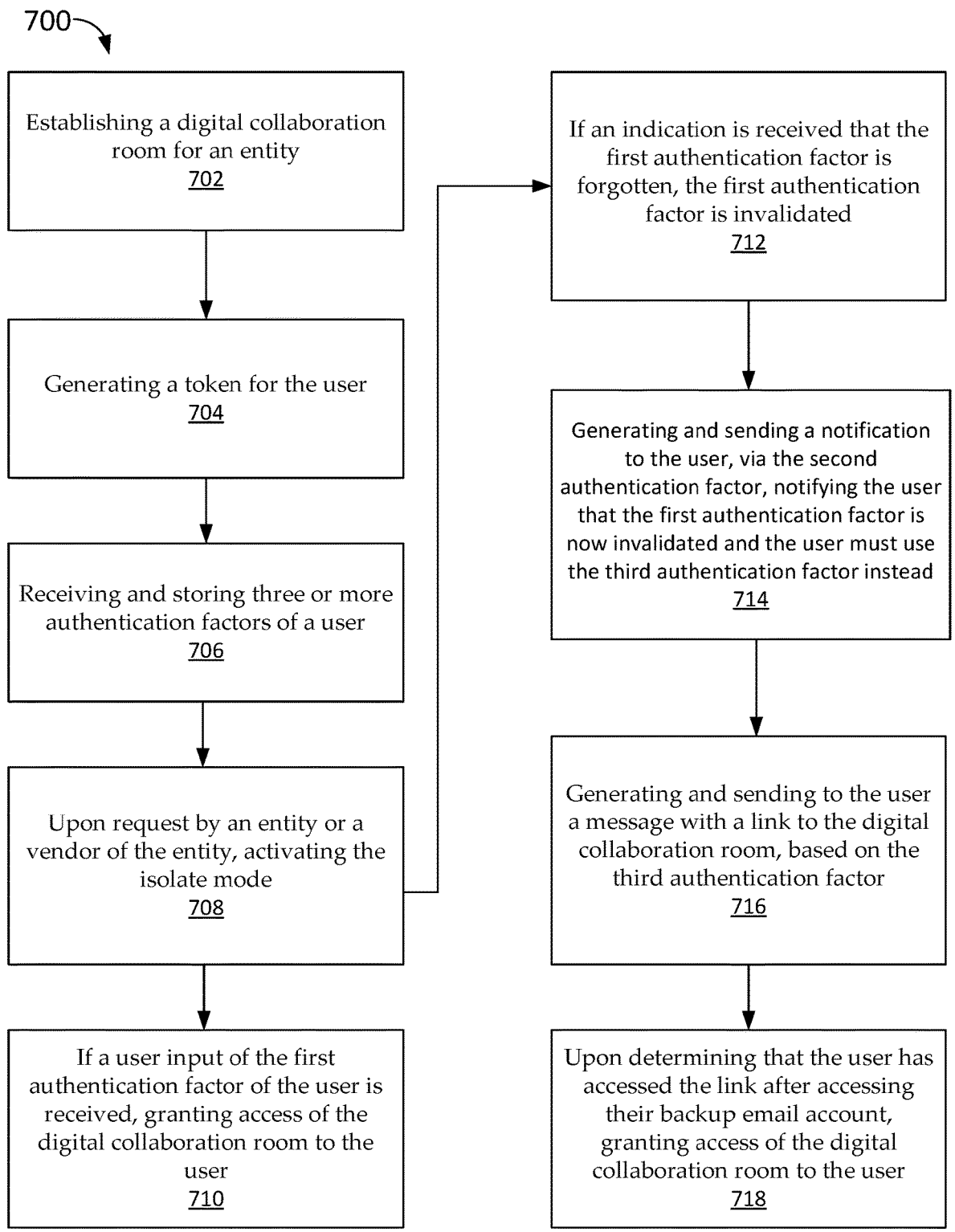
FIG. 7 is a flowchart of an example method of the present disclosure, according to various embodiments.

FIG. 7 is a flowchart of an example method 700 of the present disclosure. The method 700 can include a step 702 of establishing a digital collaboration room (digital collaboration room 108A and digital collaboration room 108B) for an entity, where the digital collaboration room being configured to allow users to perform actions on data obtained from a database and placed into the digital collaboration room. In some instances, the entity and collaboration room are each given a unique ID. The digital collaboration room is established via the orchestration service 106 which is a cloud resource where the digital collaboration room, owned by the entity, is hosted and made accessible to the users. The entity has control to grant permissions to the users regarding the digital collaboration room and to dynamically modify permissions of the users in real time. The users may include one or more entity users and, optionally, one or more vendor users.

The method 700 can also include a step 704 of generating a token for the user that represents the rights or permissions granted to the user. Generating the token may include encoding a tenant identifier, a digital collaboration room identifier, an access right for the user to enter the digital collaboration room, and a role for the user. To be sure, the role specifies a first set of permissions that indicate actions that can be performed by the user.

At step 706, the users are registered by the orchestration service 106. As part of the user registration, three or more authentication factors of the users are received and stored. Three authentication factors for a user can include a first authentication factor, a second authentication factor and a third authentication factor. In certain embodiments, the third authentication factor comprises a multifactor authentication, such as a multiple authentication service application loaded on the user's mobile phone. The multifactor authentication service may generate a secret code, passcode, and/or pin to be entered by the user to access a backup email account of the user.

In some embodiments, the first authentication factor relates to a corporate email account of the user assigned by the entity, the second authentication factor comprises a mobile number of the user, and the third authentication factor relates to a backup email account of the user. In further embodiments, the first authentication factor includes a username and password to login to the corporate email account of the user, which was supplied by the user to the orchestration service, and the third authentication factor relates to the email address of a backup email account that was also provided by the user to the orchestration service during their user registration.

As stated earlier, either the entity or a vendor user of the entity can request and activate an isolate mode in response to an event or incident. At step 708, upon receiving such a request by the entity or a trusted vendor user of the entity, the isolate mode is activated, thereby isolating the orchestration service and/or the digital collaboration room from other aspects, tools, corporates pieces, or services belonging to the entity. In some embodiments, the isolated orchestration service and/or the digital collaboration room are components of the platform that is isolated, removed or otherwise severed from the rest of the entity's ecosystem of corporate tools and services. In other embodiments, activating an isolate mode and isolating the digital collaboration room further comprises severing any and all integrations on multiple levels with the digital collaboration room (such as the integrations of the digital collaborate room with any other portion of the entity's ecosystem), and blocking any further attempts of integrating the entity's ecosystem with the digital collaboration room. In some embodiments, activating the isolate mode also means that the tokens that were generated by the orchestration service 106 in step 704 for the users are revoked, canceled or otherwise deactivated, such that the tokens are no longer valid, so that the users lose their previous rights to gain access to the entity's digital collaboration room.

After step 708, the method 700 continues with either step 710 or step 712. At step 710, if the orchestration service receives a user input of the first authentication factor of the user, then the entity user is granted access to the digital collaboration room of the entity. In other words, if the user correctly enters the username and password of the corporate work email associated with the user according to the stored tenant data of the entity, then nothing appears to have changed, from the user's perspective, even though the isolate mode has been activated. The user can gain access to the digital collaboration room of the entity, despite the fact that the isolate mode has been activated.

On the other hand, if the orchestration service does not receive a user input of the first authentication factor of the user, but instead the orchestration service receives an indication that the user has forgotten the first authentication factor (such as the username and/or password for logging into the corporate email account of the user), then at step 712, the first authentication factor of the user is invalidated. In other words, if the user input indicates that the user has forgotten their username and/or password to their corporate email account, the orchestration service will not grant access to the digital collaboration room using the previously accepted first authentication factor of username and password.

Instead, at step 714, a notification is generated and sent to the user via the second authentication factor. In some embodiments, a notification typically is sent in the form of a text message to a mobile number of the user. The text message informs the user that the first authentication factor is now invalidated, and that the user must use the third authentication factor instead, in order to eventually obtain access to the digital collaboration room. Typically, the third authentication factor includes the backup email account of the user. In other words, rather than blocking the user entirely, after invalidating the first authentication factor, the orchestration service notifies the user via the second authentication factor (which is still valid) and reroutes the user to safer, more secure pathway to the digital collaboration room, by way of a third authentication factor (which is still valid) or handshake.

At step 716, a message to the user with a link to the digital collaboration room is generated and sent to the user by the orchestration service, based on the third authentication factor. In some embodiments, the third authentication factor is a backup email account or backup email address of the user, and the message is an email sent to the user's backup email account.

At step 718, after it is determined by the orchestration service that the user has accessed the link by accessing their backup email account and clicking on the link, the user is granted access of the digital collaboration room. However, it should be noted that if the token that was generated for the user at step 704 still exists, the orchestration service can first evaluate the token of the user to determine if they have permission to enter the digital collaboration room before determining whether to grant access to the digital collaboration room at step 718. In some instances, the token can be linked to a session policy for the user. That is, the actions of the user can be managed on a session-by-session basis.

If the entity user is granted access to the digital collaboration room at step 718, the method 700 can continue with an optional step (not shown) where a request to perform an action on a portion of the data from the user is received. For example, the user can submit a query to identify documents that are relevant to one or more keywords.

The method 700 may also include an optional step (not shown) of performing a hierarchical permissions analysis to determine if the user has permission to perform the action and access the portion of the data. The hierarchical permissions analysis can also include a step of determining if the user currently has permission to enter the digital collaboration room. As noted above, this can include evaluating an access right included in the token for the user.

Assuming that the permissions analysis is successful, the method 700 can include a step of retrieving the portion of the data from the database for the digital collaboration room and allowing the user to perform the action when the user currently has permission to enter the digital collaboration room and the user has permission to perform the action and access the portion of the data. If the permissions analysis is unsuccessful, the user can be presented with a message informing them that they lack permission to perform the requested action.

Figure 8:
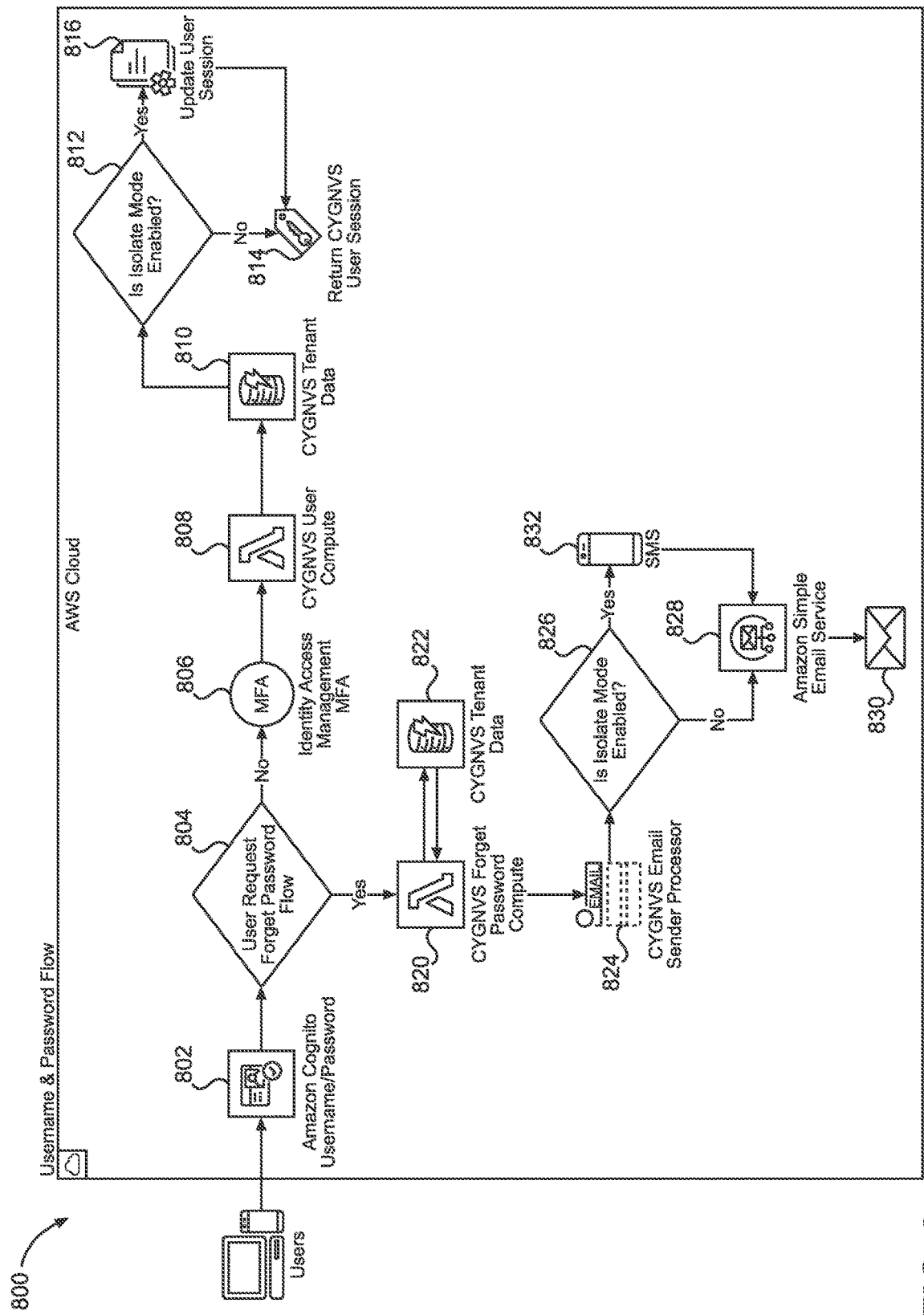
FIG. 8 is a flowchart of an example method of the present disclosure related to a username and password flow, according to various embodiments.

Turning now to FIG. 8, FIG. 8 depicts an exemplary flowchart 800 of the present disclosure relating to the username and password flow. The username and password flow or pathway provides the user access to the digital collaboration mode. The exemplary method is behind a computing cloud, such as AWS Cloud. In some embodiments, at step 802, the system uses Amazon Cognito to identify the user via an authentication of username/passcode (which, in some embodiments, can be considered the first authentication factor as described above). When a user attempts to log in, the user triggers the username and password flow. At step 804, the user will have an option to login or ask for a password reset of the user's corporate email account.

If the user chooses to login and the user successfully enter their credentials (username and password) relating to their corporate email account, then an identity access management MFA (multifactor authentication) is triggered at step 806. At steps 808 and 810, the orchestration service is triggered to check an associated database regarding the tenant data, to confirm the user's identity and grant the user a token, which will allow the user to use the application, (e.g., to communicate with the orchestration service, be granted tokens, etc.) and access the digital collaboration room. At step 812, the orchestration service also checks the tenant account of the entity, to determine whether the isolate mode has been activated or is turned on. If the isolate mode is turned off, at step 814, the user will return to their user session, such that the user can gain access to the digital collaboration room of the entity. If the isolate mode is turned on, at step 816, the user session is updated by the orchestration service, such that the user will still gain access to the digital collaboration room of the entity, even though the isolate mode is turned on.

Still referring to FIG. 8, if at step 820 the user triggers the "forgot password" flow (by clicking on a "forgot password" button or some similar means), then the orchestration service will check the database of tenant data at step 822 and determine whether the tenant's isolate mode is turned on. The user's "forgot password" request will be forwarded to an email sender processor at step 824. The orchestration service may include the email sender processor, or the email sender processor may be coupled to the orchestration service.

Next, at step 826, the orchestration service determines whether the tenant's isolate mode is turned on. If at step 826 the orchestration service determines that the tenant's isolate mode is off, at steps 828 and 830, a secure password reset code email is sent to the user's corporate email address using an email server, such as Amazon Simple Email Service.

On the other hand, if at step 826, the orchestration service determines that the tenant's isolate mode is turned on, then at step 832, a text message is sent to the user's mobile phone, indicating that the tenant's isolate mode is turned on and that the secure password rest code will be sent to their backup email account. A secure password reset code email is then sent to the user's backup email address using an email server, such as Amazon Simple Email Service.

Figure 9:
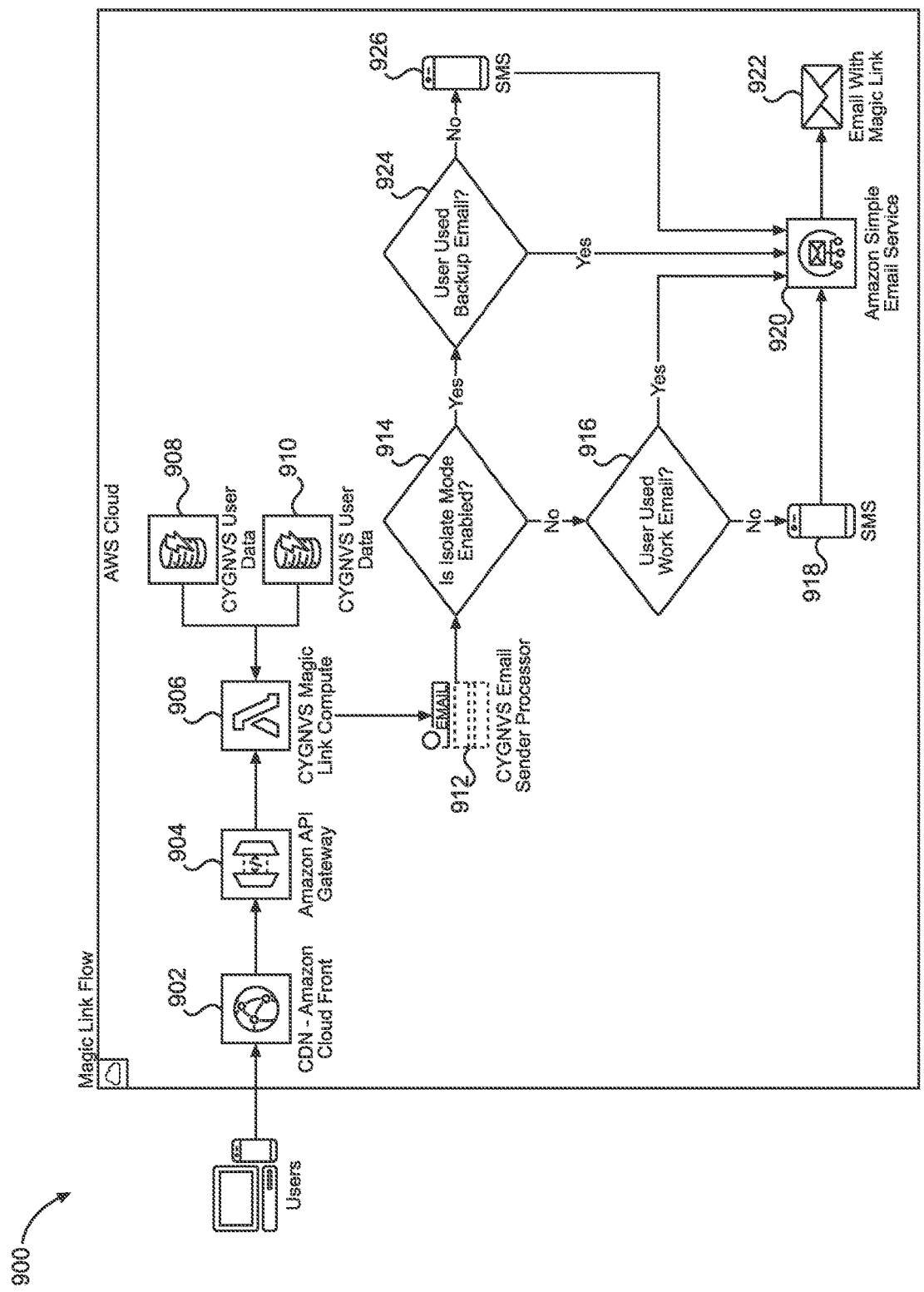
FIG. 9 is a flowchart of an example method of the present disclosure related to a magic link flow, according to various embodiments.

FIG. 9 is a flowchart of an example method 900 of the present disclosure related to a magic link flow. As mentioned previously, a user can request a magic link which is a login that does not require a password. The user's request navigates from a content delivery network (CDN, such as Amazon Cloud Front) to an API (application programming interface) gateway at step 902 and 904. At step 906, the API gateway triggers and communicates with the orchestration service. Then at steps 908 and 910, the orchestration service securely gathers or otherwise retrieves the user's basic details (to determine the user's corporate email address with the entity, the user's backup email address which is considered the second authentication factor, and the user's mobile number which is considered the third authentication). The orchestration service also retrieves the user's tenant account details, which will also include the information of whether the entity tenant's isolate mode is turned on or off.

At this point, at step 912, the user's request for a magic link is then forwarded from the orchestration service to the email sender processor. The orchestration service determines whether the isolate mode is on or off for the tenant at step 914 (typically by checking the tenant itself and/or the database of tenant data). If it is determined that by the orchestration service that the entity's isolate mode is turned on, then at step 924 the orchestration service evaluates whether the user used their backup email credentials to log in. If the user logged in using their corporate email credentials, then at step 926, the user is sent a text message from the orchestration service by way of the user's mobile phone. The user is notified in the text message that the first authentication factor (e.g., the user's corporate email account) is invalidated and they should login to their backup email account. At steps 920 and 922, the magic link is sent in an email message to the user's backup email account. Once the user logs in, gains access to their backup email account, and clicks on the magic link of the email message, then they are able to access the digital collaboration room.

If, however, at step 914 it is determined that by the orchestration service that the entity's isolate mode is turned off, then the orchestration service determines whether the user logged in using their corporate email account credentials at step 916. If the user did not use their corporate email account credentials to log in, then the flow continues with step 918, at which point the orchestration service sends a text message to the user's mobile phone, notifying them that they should use their corporate email credentials to log in. At steps 920 and 922, an email is sent by the orchestration service (with the help of an email service) to the user's corporate email account containing a magic link. When the user accesses their corporate email account and clicks on the magic link, the user gains access to the digital collaboration room.

However, if at steps 914 and 916, the orchestration service determines that the user logged in using their corporate email account credentials and the entity's isolate mode is turned off, the flow continues with steps 920 and 922. At steps 920 and 922, the magic link is sent in an email message to the user's corporate email account. Once the user gains access to their corporate email account and clicks on the magic link of the email message, then they will be able to access the digital collaboration room.

Figure 10:
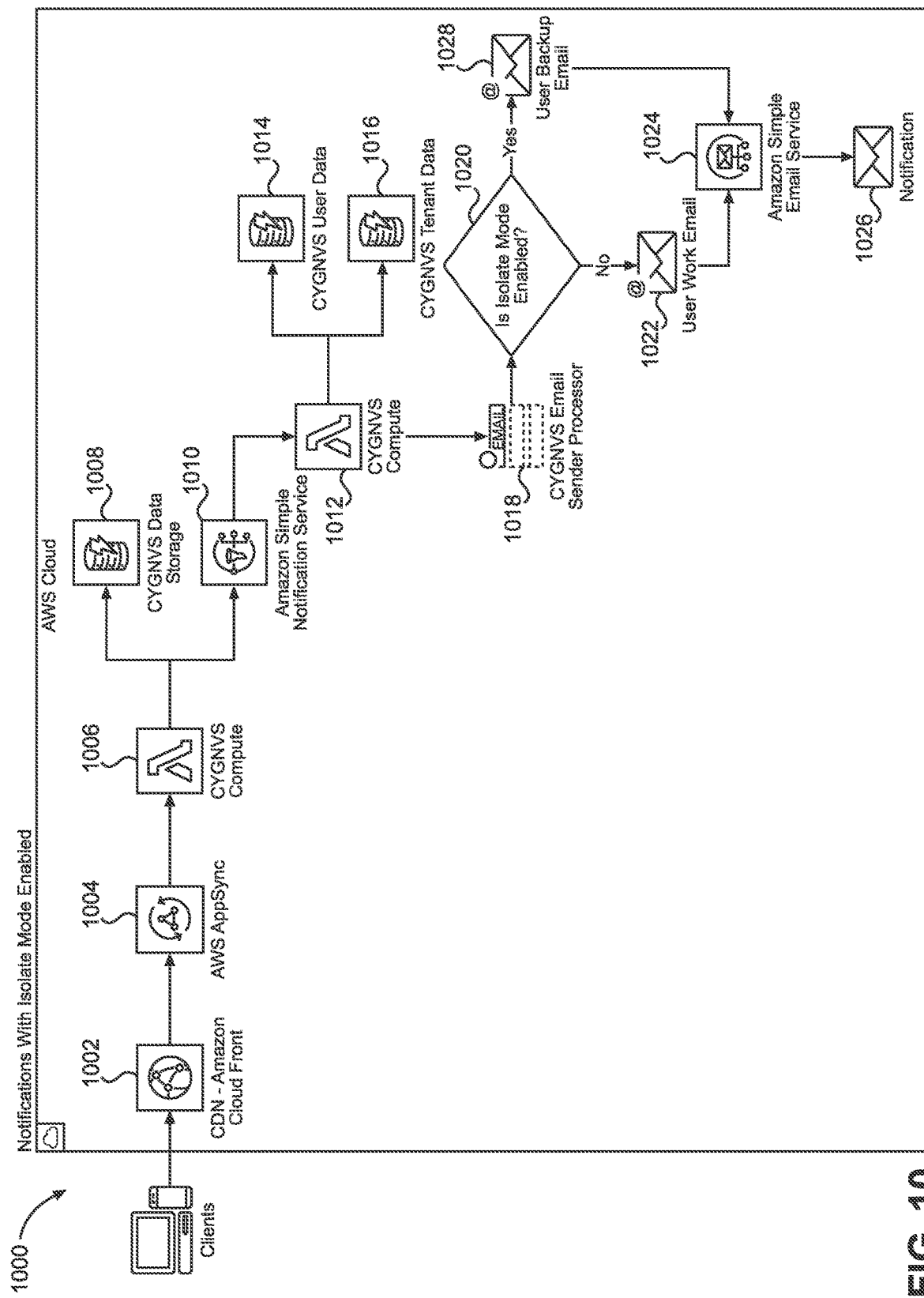
FIG. 10 is a flowchart of an example method of the present disclosure related to notifications with isolate mode enabled, according to various embodiments.

FIG. 10 is a flowchart of an example method 1000 of the present disclosure related to notifications with isolate mode enabled. One aspect of the present disclosure is the need to direct communications to the users in a secure and proper manner, when the isolate mode is enabled for a given tenant/entity. The method 1000 begins when a user triggers an action in the application. At steps 1002 and 1004, the user's request navigates from the CDN into an API routing manager, such as AWS AppSync. At steps 1006, 1008 and 1010, the orchestration service accesses its data storage and an event is published using a notification service, such as Amazon Simple Notification Service. If a user is tracking a topic (perhaps by a subscribed topic), and a change is made regarding that topic, then the user is notified of the change. At steps 1012, 1014 and 1016, the orchestration service then accesses both the user data and the tenant data. At step 1018, the user's request is directed to the email sender processor.

At step 1020, if the orchestration service determines that the isolate mode is off, then then the orchestration service directs communications from the entity to the user's corporate email account at steps 1022, 1024 and 1026. If the orchestration service determines that the isolate mode is on, the orchestration service directs communication from the entity to the user's backup email account at steps 1028, 1024 and 1026.

Figure 11:
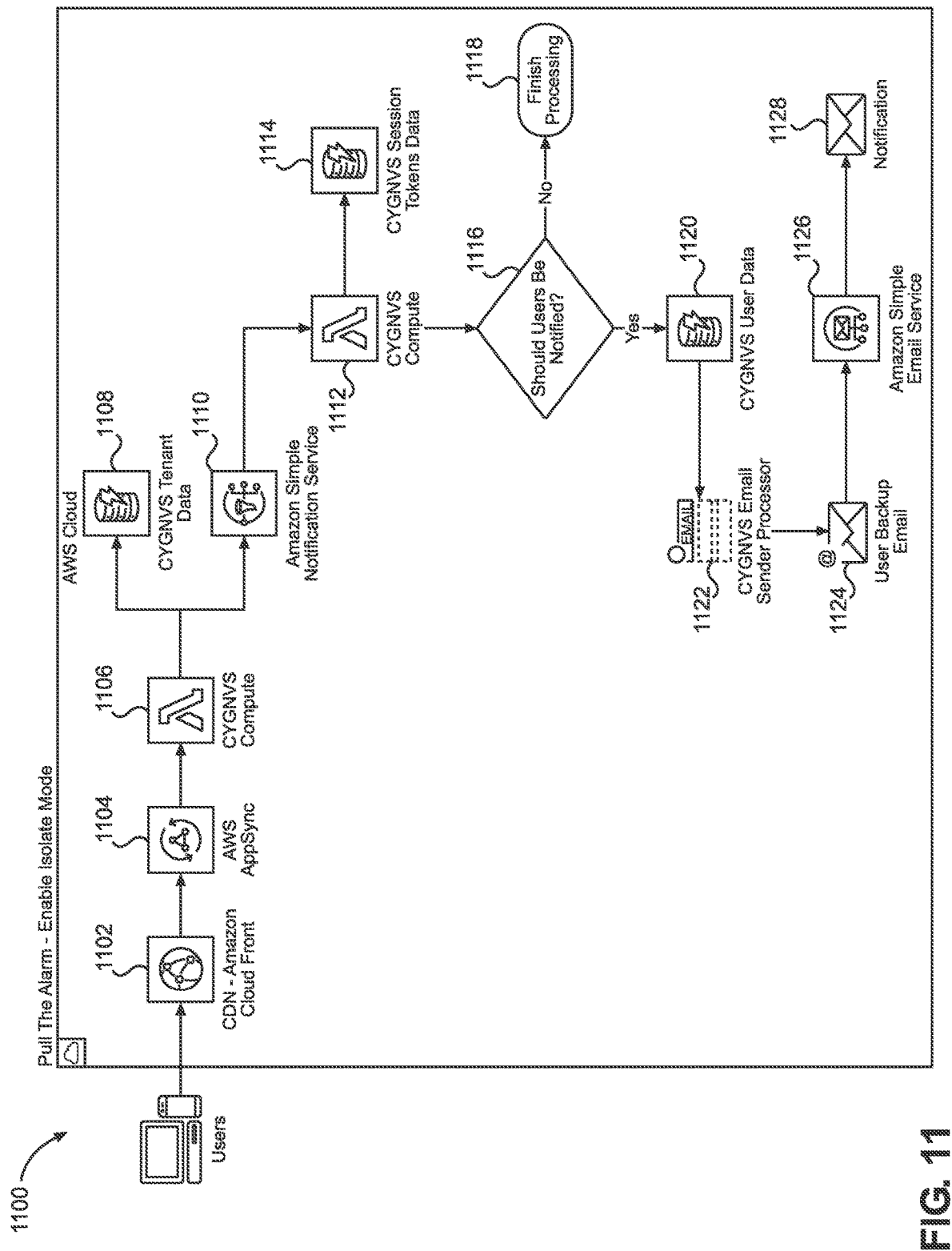
FIG. 11 is a flowchart of an example method of the present disclosure related to enabling isolate mode, according to various embodiments.

FIG. 11 is a flowchart of an example method 1100 of the present disclosure related to enabling isolate mode. This is otherwise called "pulling the alarm." The isolate mode begins with a request to enable isolate mode. As mentioned previously, the request to enable isolate mode is typically initiated by the entity at the tenant level or by a vendor user on behalf of the entity. At steps 1102 and 1104, the request is navigated from the CDN to an API routing manager, such as AWS AppSync. At steps 1106 and 1108, the orchestration service handles the request, and the records of the specific tenant in the tenant database are updated to show that the isolate mode is on for the given tenant.

At step 1110, the orchestration service communicates with a notification service, such as the Amazon Simple Notification Service. Once the isolate mode is triggered, at steps 1112 and 1114, the orchestration service invalidates all active user sessions, all users' tokens (by wiping out the applicable database) and any API keys held by any tenant. At step 1116, the orchestration service also determines if the users should be notified. If all the users are not to be notified (for instance, if the activation of the isolate mode is merely a test), then the method 1100 concludes at step 1118 and the processing ends. If at step 1116 the orchestration service determines that the users are to be notified, then the orchestration service checks the user data of the tenant at step 1120. The orchestration service determines which users are to be notified. Using an email sender processor at steps 1122-1128, the orchestration service determines a user's backup email account and then sends an email informing the user that the isolate mode is on for the tenant, using an email service such as the Amazon Simple Email Service. In some embodiments, the orchestration service may send an email to the user's backup email account, where the email includes a magic link to the digital collaboration room for the user to click on.

Figure 12:
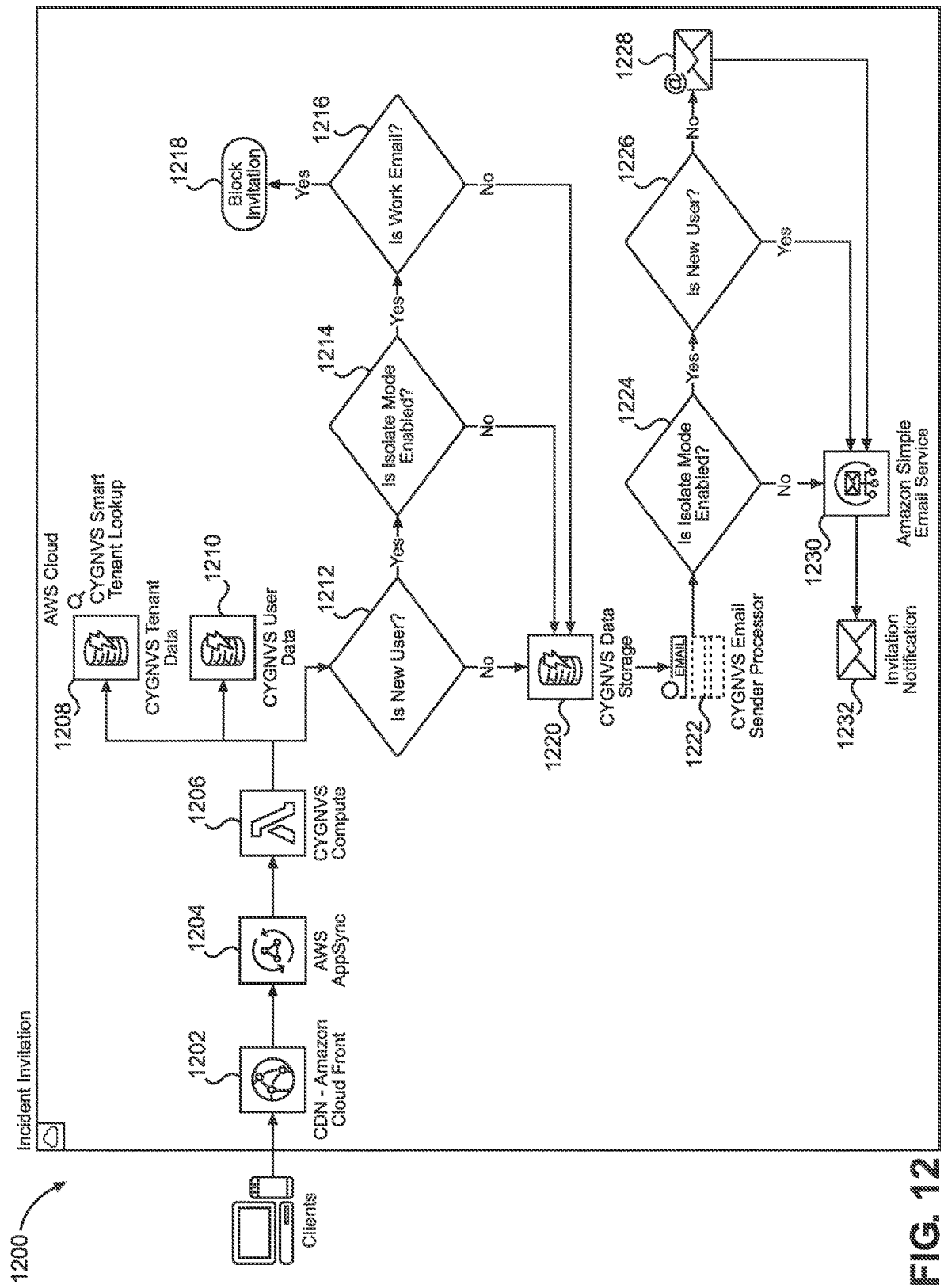
FIG. 12 is a flowchart of an example method of the present disclosure related to incident invitation, according to various embodiments.

FIG. 12 is a flowchart of an example method 1200 of the present disclosure related to incident invitation. The method 1200 manages how to invite a user into an incident, regardless of whether the tenant is in "peace time" and "war time" (e.g., when the isolate mode is on). A user is invited to join the platform, typically using a user's corporate email, in order for the user to access the digital collaboration room of the entity/tenant.

At steps 1202 and 1204, the request navigates from the content delivery network into an API routing manager, such as AWS AppSync. At steps 1206, 1208 and 1210, the user data and the tenant data are matched by the orchestration service based on the user's and tenant domains. In other words, if the user's domain matches that with the tenant's domain, then the user presumably was invited by the tenant entity.

Next, at step 1212, the orchestration service determines if the user is a new user. If the orchestration service determines that the user is a new user to the platform, and then the orchestration service determines at step 1214 that the isolate mode is on for a given tenant that purportedly wishes to invite the user to gain access to the incident, this may be a suspicious activity. If the isolate mode is on, and the orchestration service determines at step 1216 that the invitation to the new user includes an email that belongs to the compromised account, the invitation for the user to register with the platform is blocked at step 1218.

If at step 1212 it is determined that the user is not a new user, then at steps 1220 and 1222, the orchestration service checks its data storage for the tenant, and activates its email sender processor. The email sender processor then takes the responsibility at step 1224 to determine whether the isolate mode is on or off. If the isolate mode is off, then at steps 1230 and 1232, the email sender processor of the platform, with the help of an email service, sends an email, inviting the user to join the incident. If the isolate mode is on at step 1224 and the email sender processor determines that the user is a new user at step 1226, then the email sender processor of the platform, with the help of an email service, sends an email, inviting the user to join the incident. If the isolate mode is on at step 1224 and the email sender processor determines that the user is not a new user at step 1226, then at step 1228 the email sender processor of the platform, with the help of an email service, sends an email to the user's backup email address, inviting the user to join the incident.

It should be noted that the steps described herein or depicted in any of the figures can be performed in any order. The present disclosure is not limited to merely the specific order of the method steps as described herein. Furthermore, the method steps for any of the exemplary methods provided herein may be performed using any component of the platform, including but not limited to the orchestration service, as depicted in FIG. 1 and as described herein.

Automatically Generating Data Incident Reports.

The current process for generating data incident reports includes an incident manager collecting incident information (e.g., incident data) regarding a data incident such as a lawsuit or a data breach. For example, the incident data may be stored in a spreadsheet, word processing document, and the like. For instance, the incident manager may collect the incident data from a data forensics team that is investigating a data incident. The incident manager may prepare a data incident summary (e.g., a situational report for an executive team) or a data incident report (e.g., a regulatory report). For example, the incident manager may prepare a situational report for an executive team and email the situational report to the executive team. For instance, the incident manager may prepare a regulatory report and email the regulatory report to a regulatory person and share the regulatory report with third-party entities (e.g., a law firm, regulatory authority).

A problem with the current process for generating data incident reports is that tracking incident data after a data incident (e.g., a cybersecurity breach) is challenging and error prone. Furthermore, the tasks of sharing and generating reports for an active data incident (e.g., cybersecurity breach) is difficult. For example, pain points after a data incident (e.g., a cybersecurity breach) include the following: scatted and inconsistent incident data; difficulty for tracing origin and tracking changes of incident data; risk of people owning key data of the incident data; the cybersecurity breach response process is not dynamic (i.e., it is hard to introduce changes in a response process and it is difficult to introduce additional people to the cybersecurity breach response process); scalability limitation of manually produced reports because manually produced reports are not being scalable; and the approval process for reports is error prone and has risk of data leakage for the incident data.

Various embodiments of the present technology include systems and methods for securely tracking incident data across three phases of a data incident response including analysis, containment, and recovery, and automatically generating data incident reports.

The present technology provides solutions to problems with the current process for generating data incident reports including tracking work across data incident phases (i.e., real-time incident data) across the three phases of a data incident response including analysis, containment, and recovery. In various embodiments, the present technology enables one source of truth, which enables users with access privileges to view all incident data in one place. For example using a digital collaboration room as previously described herein.

In some embodiments, the present technology enables an audit trail including tracking origin and history of incident data. The present technology enables managing incident data for sharing and reporting (e.g., selecting what data is shared) for automatically generating data incident reports. For example the digital collaboration room may include an orchestration service and a dynamic tenancy as previously described herein. The present technology enables automatically mapping reports to incident data and automatically generating reports.

In various embodiments, the present technology enables a user to control where the incident data goes including reporting and adhering to regulations. Furthermore, embodiments include automatically receiving updates to reporting requirements to adhere to regulations including generating new reports and generating new data requests.

As previously described, the present disclosure provides systems and methods for providing secure access to collaborations rooms that may be used for automatically generating data incident reports with dynamic tenancy, even during or following an event or a crisis. As described above herein, a collaboration room can be established to allow users to access incident data pertaining to an event, such as a lawsuit or a data breach for automatically generating data incident reports. Users may be associated with the entity/tenant who may assist the entity/tenant with respect to the event.

Figure 13B:
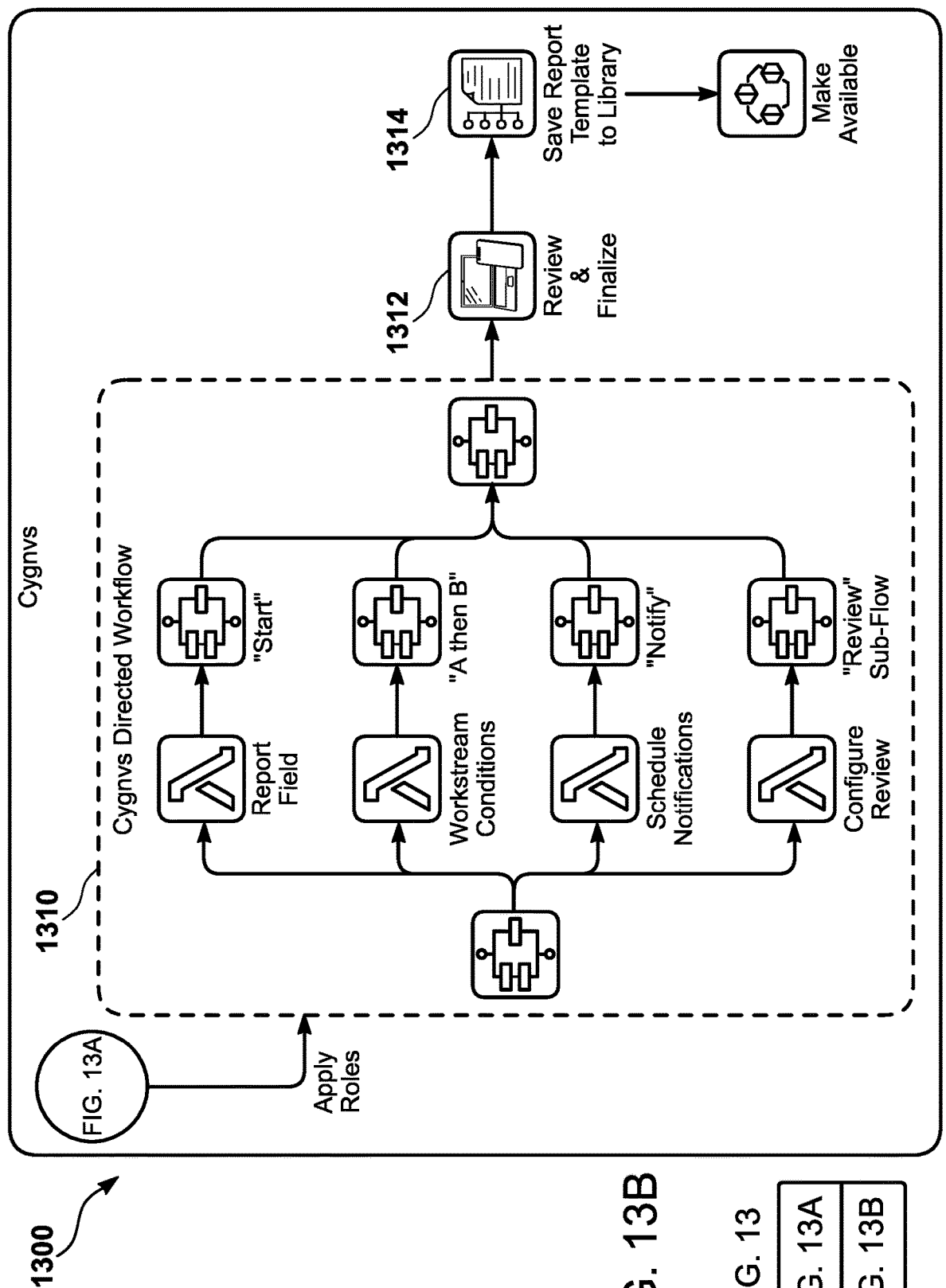

FIG. 13A and FIG. 13B are a flowchart of an example overview method 1300 of the present disclosure of managing incident report templates, according to various embodiments.

In various embodiments, at step 1302, a report configuration tool is used for generating a report template. At step 1304, a user can manage the report template. For example, a report template may be imported from a report library database. For example, a report library database may receive periodic updates. For instance, updates may include the latest version of an industry standard report template including metadata that is retrieved by the report library database. The industry standard report template including metadata may be used for generating the report template.

In various embodiments, step 1306, is applying metadata tags to the report template. Metadata tags are also referenced as "Tags", and "Tag" herein are understood by a person of ordinary skill in the art as assigning an identifier to a piece of information. For example, the applying metadata tags correlates indecent data to fields of the report template. For instance, the applying metadata tags to the report template may comprise selecting metadata tags for the report template; mapping an entity/tenant to fields of the report template; applying metadata tags to the entity/tenant and applying metadata tags to the fields of the report template.

In various embodiments, step 1308, is applying secure restricted roles to the report template. For example, each user is restricted to a subset of the fields in the report template based on the secure restricted role of each user. For example, a "reporter" role may have access to any data within the tagging tree system including all of the fields in the report template. In contrast, a restricted role may have limited access to fields of the report template. For instance, the applying secure restricted roles to the report template includes associating the secure restricted roles to the metadata tags of the report template.

Figures 14, 14A:
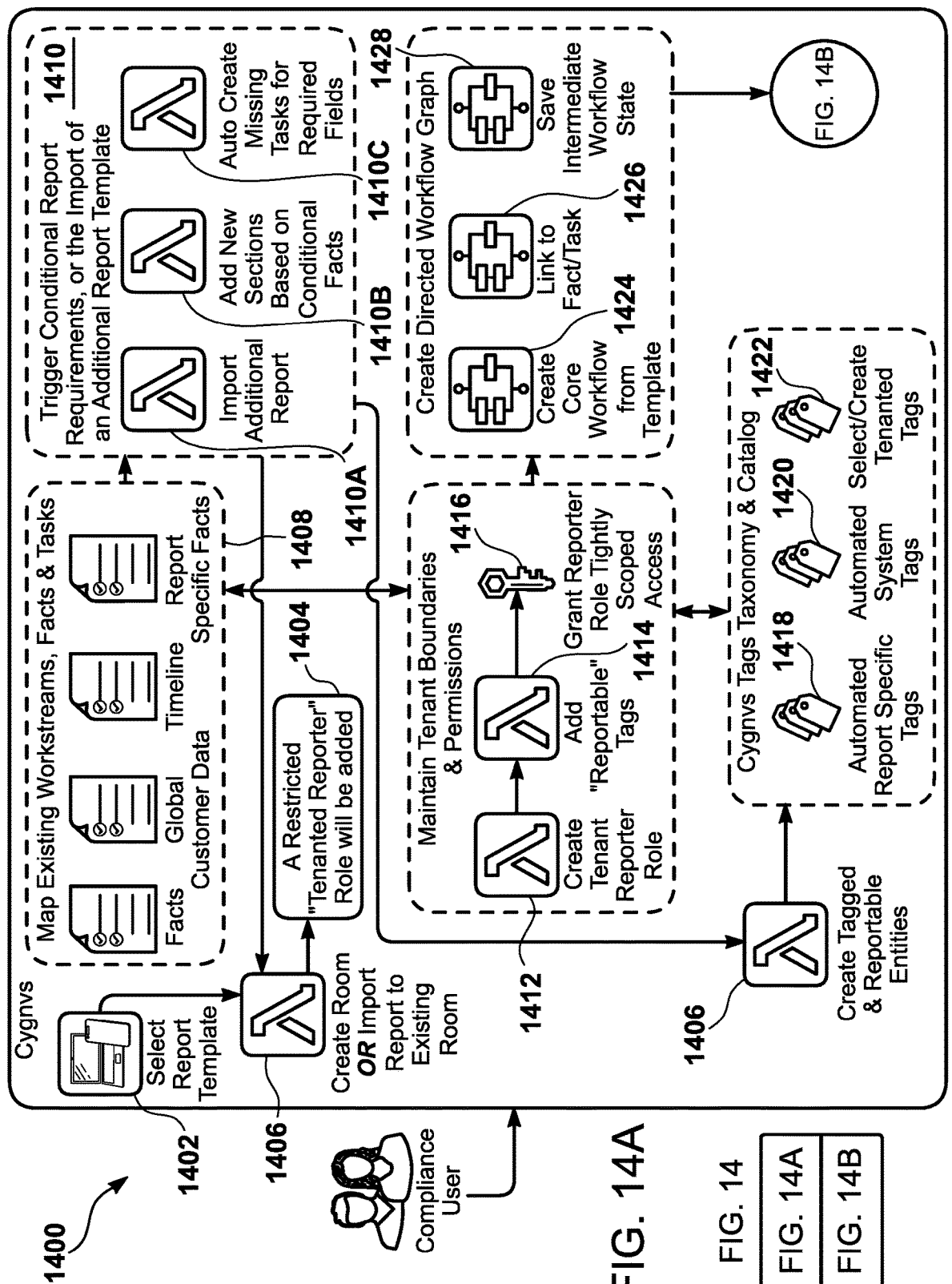
FIG. 14A and FIG. 14B are a flowchart of an example method of the present disclosure related to creating and preparing incident reports including using a report template, according to various embodiments.
Figures 14, 14B:
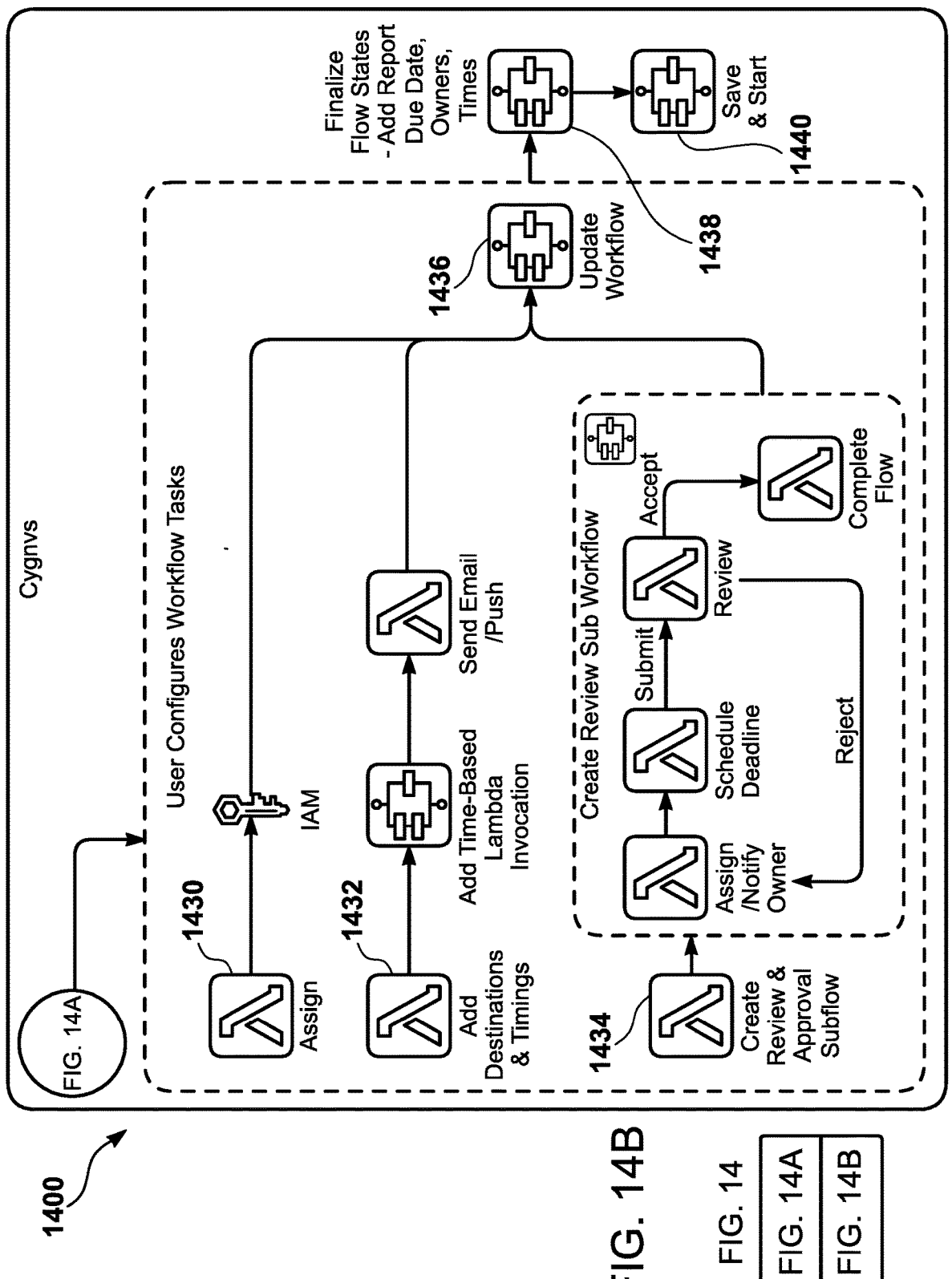

FIG. 14A and FIG. 14B are a flowchart of an example method 1400 of the present disclosure related to creating and preparing incident reports including using a report template, according to various embodiments. At step 1402, a user may select a specific report type template when either creating a digital collaboration room, or marking a report template as "reportable"-report templates comprise pre-tagged facts and tasks that are custom to the type of report being produced. For example, these report types can be regulatory (e.g., NIS2, CIRCA), executive (e.g., internal or time based reports), or customer specific (e.g., notify customers or vendors of an incident).

At step 1404 according to various embodiments, the user may be notified that that a new role will be created that has specific permissions. For example, an IAM role is an AWS identity with permission policies that determine what an identity can and cannot do in AWS. This role is tenanted and highly restricted, and the purpose is to allow a reporter role to see the tenanted data needed to fill the requirements of the report. Individual items, like tasks or facts within a data workstream, may be marked as reportable, which means reporter X may go to the reports User Interface (UI) component and see all data required for that report, but no other information from that data workstream. For example, this specialized reporter role enables protection of the current confidentiality applied to any data or data workstream within a digital collaboration room and within that tenant/entity.

In various embodiments, the new role will be created that has specific permissions may be further specialized so that sub-divisions of reporter role are enabled (e.g., daily report, NIS2 reporter, and the like) where the user will be restricted to seeing the sub types of tagged data they have been allowed to access. For example, #system::report::regulator::nis2, and so forth.

Step 1406 according to various embodiments, from the digital collaboration room or report template, includes creating data entities required as part of the standard report template flow, but also applying all required Tags to these items for role and user level restriction. Furthermore, the ability to auto suggest required missing tagged items (see step 1410A, step 1410B, and step 1410C, below). For example, this enables systems of the present technology to learn and auto apply tags even in the absence of tags defined/used within the report template. Step 1408 according to various embodiments includes mapping existing data work streams facts and tasks to the report template.

Step 1410 according to various embodiments, for an existing digital collaboration room or dataset, includes mapping the data entities required as part of the standard report template flow to required fields for that report template. For example, the required fields for the report template may be from existing facts, tenant/entity information, timeline activity, and the like. Furthermore, the mapping may be achieved using a metadata Tags system. For instance, a user may take an existing item, mark a "reportable" checkbox, and potentially use a sub type of marking depending on the report type. Within the present technology, this system translates to using standardized tags taxonomy classification that can be used to link across types, workstreams, digital collaboration rooms, tenants, region, industry, and so forth.

At step 1410A according to various embodiments, a digital collaboration room/incident response room has a one to many relationship with regards to reports. In other words, while a digital collaboration room may be created with one report in mind, at a later point another report can be manually imported/added, or even automatically added depending on the context of the information supplied for facts and tasks. According to various embodiments, answers to a specific fact or task may trigger the need for another report to be imported into a digital collaboration room. For example, a fact relating to whether PII was exposed to could trigger the automatic inclusion of a report specific to that scenario. Adding that new report would then trigger a new instance of this entire flow (create tagged entities, assign role, and so forth).

At step 1410B according to various embodiments, context specific answers may also trigger the creation of additional facts/tasks if required. For example, there will be instances when an answer to a given fact can add five other new facts, all of which will fall within the bounds of the Tagg, role restricted, and flow directed process.

At step 1410C according to various embodiments, systems of the present technology examine all mapped fields required for the report type, cross reference across the set of Tagged entities currently mapped in the digital collaboration room, and suggest or auto create any tasks/facts still outstanding. For example, six of ten required (Tagged) fields have been created by the creation of the digital collaboration room, another three have been mapped by the user, but the final task may still need to be mapped (sub type: #system:: report:: regulator:: nis2:: incident_report_date). For example, see Tags Taxonomy and catalog in step 1420, step 1422, and step 1424 below.

Step 1412, according to various embodiments, is creating tenant and digital collaboration room restricted virtual "reporter" role. The virtual "reporter" role has access to any data within the tagging tree system (i.e. #system::report:: regulator::nis2::*) that apply for a given report, and can be further restricted for sub divisions of report type, by report section, and so forth. For example, this enables for the collection and collation of "reportable" data across all entity types, including restricted data workstreams, where the conditions for the viewing/usage of that restricted data is on an opt-in type system. For example, a customer is required to specifically mark that restricted piece of data as "reportable"—data marked in this way is available to any user with the reporter virtual role, while completely excluding them access to all other types of data, completely maintaining the existing confidentiality, tenancy, security, and permission boundaries.

Step 1414 and step 1416, according to various embodiments, include automatically tagging reportable/relevant entities from the report/digital collaboration room template, which are required for reporting. For example, this automatically tagging reportable/relevant entities explicitly grants the reporter role access to that entity or data. For example, a workstream created with Fact A, Fact B and Fact C, and user X, user Y, user Z has the following tagging for various roles. For instance, user X has IAM role::regulatory-reporter-role, user Y has sub-role IAM::Nis2-Internal-Role, and user Z is a standard owner role within that data workstream. Fact A: tag with #system::report::regulator::*. Accordingly, Fact A is visible to user X and user Z. Fact B: tag with #system::report:regulator::nis2::internal. Accordingly, Fact B is visible to user X, user Y and user Z. Fact C: has no tag applied. Accordingly, Fact C is visible to user Z only.

Turning to step 1418, step 1420, and step 1422, that may be used for a metadata tags taxonomy and catalog system of the present technology, according to various embodiments. For example, the tags taxonomy and catalog system enables power and flexibility when correlating incident data across types (facts, tasks, etc.) with different digital collaboration rooms for a client tenant/entity, but also due to the highly structured but fundamentally anonymous nature of the tagging hierarchy of the tagging tree system. The tags taxonomy and catalog system allows correlation report usage within a given client tenant/entity, which allows, for example, statistical analysis of NIS2 reports by regions. For instance, the correlation statistical information for all reports or digital collaboration rooms (or any entities/tenants) across the entire ecosystem using these tags, without a need to be aware of any of the relevant data within these items. In some embodiments, a client tenant/entity may create their own scoped tags. For example, (#tenanted::tenant_id::financials:: region X::*).

At step 1418, according to various embodiments a report template is imported or digital collaboration room is created from a report template. For instance, all report specific required metadata tags are read from the report template and these metadata tags are assigned to the "Reportable" items within that digital collaboration room. For example, #system::report::regulator::nis2::*.

Step 1420, according to various embodiments, is assigning system tags, such as #system::report::regulator::nis2, #system::tenant::report, #system::report::region, and so forth.

Step 1422, according to various embodiments, includes allowing the client to select or create client tags from their own sub types within the tag taxonomy. For example, these client tags are scoped to that client only and will be treated in the same way any piece of tenant or digital collaboration room based information with regard to tenant, security, and permission boundaries. Furthermore, these client metadata tags allow for searching by client tag while still maintaining tenant and permission boundaries.

Turning to step 1424, step 1426, step 1428, step 1430, step 1432, step 1434, step 1436, step 1438, and step 1440 are directed to a workflow system according to embodiments of the present technology. For example, a guided/directed workflow system according to the present technology.

At step 1424, according to various embodiments, once all required items have been either created or imported from the report/room template, any items that have been marked within that report template as being of a directed workflow have an AWS step function state machine defined for that item. The step function state machine allows for the definition of a directed flow of steps from a start state to an end state. In other words, directed meaning that the workflow is not allowed to proceed to the next stage until some definition of "completed" is done. For example, at each step within the state machine is organized either in sequence or in parallel to other steps, and this is determined via the definition and ordering given with the report template. Examples of this style of flow definition include the following. An ordered list of stages (i.e., data workstream groups): [prep, collect, analyze, report]. For example, collection may not begin until preparation is complete, and so forth. Stage "analyze": {steps: [workstream-a, workstream-b]]} Phase A contains Workstreams A and B and these can be run in parallel.

Workstream A: {next: [workstream-c]}—Workstream A flows on to C, and C is not available to start/edit until the Workstream A has been completed}.

Step 1426, according to various embodiments, for each step created from the core workflow defined in the report template, includes linking each step to the concrete entity created within present technology (i.e., in the report template). For example, there may be Task X in Workstream Y that is linked to a Step Z. Once each of these item definitions has been created, the definition are linked such that the triggering of Step Z in the state machine will allow access to that linked task, the triggering of the scheduling for email sending, and so forth.

Step 1428, according to various embodiments, is saving of the intermediate stage of the state machine, as the user has the ability to make manual changes to the steps as expressed in the user interface (UI).

Turning to FIG. 14B, step 1430, step 1432, step 1434, step 1436, step 1438, and step 1440, are directed to a workflow system including enabling a user to configure the workflow tasks according to embodiments of the present technology.

Step 1430, according to various embodiments, includes using the User Interface (UI) for assigning a user, or a group of users, to a given fact/task/workstream. Each of these users may have responsibility for the "completed" state of a said item, which may then be used to trigger progression to the next step or phase of the workflow.

Step 1432, according to various embodiments, includes determining destinations and timings. The UI enables the assignment of a destination (e.g., internal, executives, regulators, an external customer . . . ) for the output of a given stage. For example, the completed report may be sent to the compliance and regulatory body requiring the report, a subset thereof, or something as simple as a given task or fact/fact group completing notification has been completed. Once these destinations are configured, these destinations also may be triggered to be delivered on a schedule such as daily, completion only, weekly, and so forth. Once the user completes this segment, the configuration is added to the step definition for when the workflow and step are activated.

Step 1434, according to various embodiments, includes reviewing certain items requires a review sub flow. The sub flow is defined as a sub flow triggered by the item (e.g., task being marked as "review required" in the UI), which may then be further refined by adding a reviewer, scheduling notifications for both the owner and reviewer if deadlines are missed by either, re-review cycles, and then a set of accept or reject states. For example, reject results in the owner being notified of extra work being needed with comments to that effect, at which point the sub review flow is re-triggered, or being accepted by the reviewer, in which case the original task may then be allowed to move on to whatever is defined as the "next" step. For example, another task, the closing of a workstream, and so forth.

At step 1436, according to various embodiments, all the of these previous stages are updated into the report/room workflow, and saved for a final review.

At step 1438, according to various embodiments, the user has an option to make any final adjustments to the direction of control and steps within the workflow. For example, moving a workstream to a different phase, reversing the linkages between two items if the ordering is now different, and the like.

At step 1440, according to various embodiments, the digital collaboration room/preparation room is marked as being "ready", which adds an end state to the workflow, completing the definition of the DAG and allowing for it to be activated/started once the digital collaboration room goes from being preparation to an active incident where data and control flow through the pre-defined steps.

Figure 15A:
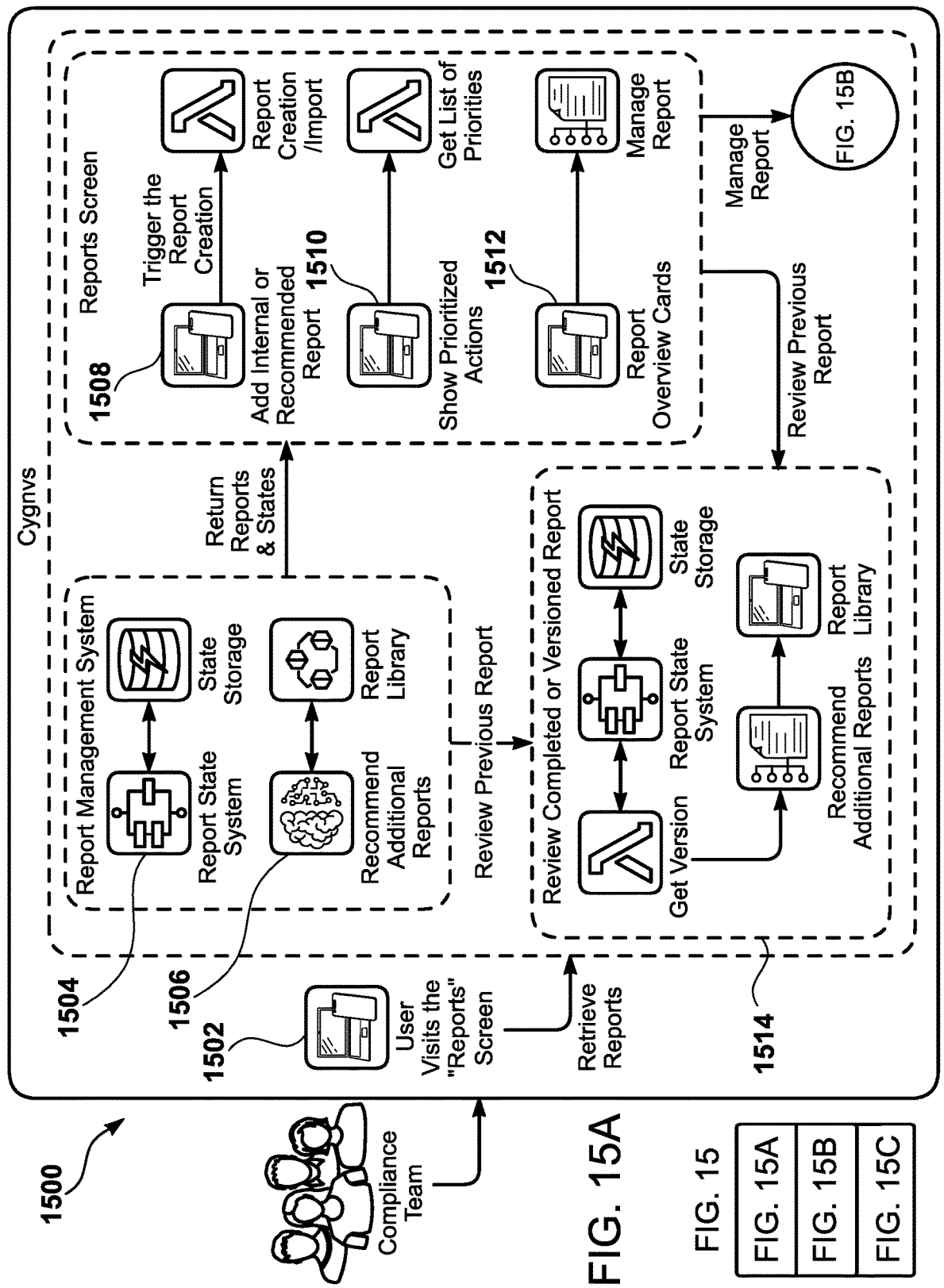
Figure 15B:
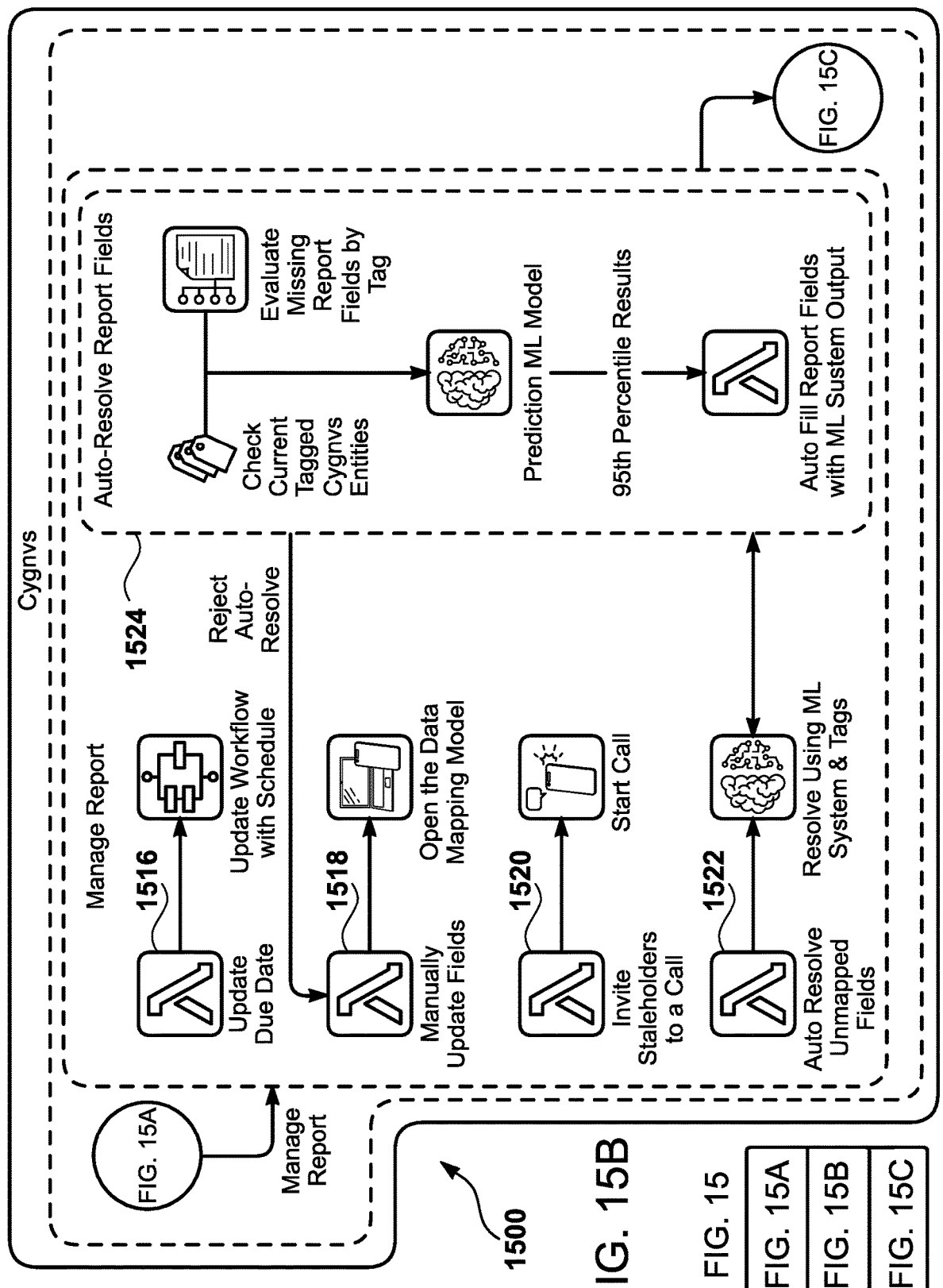

FIG. 15A, FIG. 15B, and FIG. 15C are a flowchart of an example method of the present disclosure related to managing incident reports, according to various embodiments.

The method 1500 includes report for managing incident reports using a management and approval UI, which enables a user (e.g., a member of the compliance team) that has been granted the role for viewing and editing incident reports to see the following: real time status of incident reports in progress or incident reports that have been submitted; incident reports that are required or recommended by the intelligent recommendation Machine Learning (ML) system; enabling updating of incident reports; and enabling of viewing of closed, submitted or versioned incident reports. Again, this entire flow of method 1500 is protected by the same highly prescriptive IAM role based security system that maintains tenant boundaries, user permissions, and data confidentiality, while also further restricting users by allowing a custom roles that can only access scoped and tagged data.

At step 1502, according to various embodiments, a user with the appropriate role (permissions) may visit the reports UI.

At step 1504, according to various embodiments, the reports UI makes a network request to establish the role and permissions, and then requests the current or previous incident reports along with their associated state.

At step 1506, according to various embodiments, the reports UI uses the recommendation system to suggest incident reports to the user, or client, should create based on factors like their region, size, market cap, industry, and so forth.

At step 1508, according to various embodiments, using the reports UI, the user may choose to create an incident report from the report library database based on need, or from a recommended list that are provided. If the user chooses to recommend report template this will result in a trigger the report creation flow (shown in FIG. 14A and FIG. 14B).

At step 1510, according to various embodiments, the user may select through into a list of prioritized tasks. For example, incident reports due for submission within specific timeframe, a review or approval stage that has been assigned to the user, and so forth.

At step 1512, according to various embodiments, a list of report overview cards is presented and each overview card contains data on the current status, or progress, of the incident report, the date for submission, any labels associated with the report (e.g., region, report type, and the like) and frequency of this type of incident report. The report overview cards also shows any stakeholders assigned to the report, as well as a submission mechanism and outstanding items needed in order to complete the report.

At step 1514, according to various embodiments, previously submitted or versioned incident reports are accessed in a read-only capacity. For example, once an incident report has been saved (required for versioning or submission) the current state of the saved incident report and all associated data that was present at that point is retrieved from the state and report management systems and displayed for any user with the correct level of access.

Managing or updating a Report are described at step 1516, at step 1518, at step 1520, at step 1522, and at step 1524, according to various embodiments. At step 1516, according to various embodiments, once an incident report is created, via either creating a digital collaboration room using the report library database, or adding a report from the library to an existing digital collaboration room, the incident report may then be updated as needed with extra data, dates, and stakeholders. This incident report updating process enables for the control flow between stages as defined in the underlying state machine, or directed workflow, for the incident report type.

At step 1518, according to various embodiments, the incident report shows all required fields and their current state, highlighting fields that are still in need of actioning/filling/completing. The user may edit the core top level report fields at this point by adding the base data, such as contact information, organization details, incident description, and so forth. doing so will open the data mapping modal (described in FIG. 14A and FIG. 14B) that enables for the linking of a report field to data within either the tenant or the incident comments, timelines, and so forth using tags.

At step 1520, according to various embodiments, a teleconference with relevant stakeholders is created on demand or scheduled within the context of this incident report so that outstanding tasks, dates, missing fields, and so forth, may be discussed and resolved as quickly and frictionlessly as possible. The teleconference system uses existing voice communication tooling to ensure that it can only be accessed as users who are members within the platform of the present technology, that have been invited to this tenant/entity and verified, and have access to this incident report, thereby further ensuring information security.

At step 1522, according to various embodiments, a top level Call To Action (CTA) is displayed that the user may select to automatically detect and fill the required empty fields by auto resolving unmapped fields. The system triggered by this CTA uses the predictive recommendation system, which makes extensive use of the tagging hierarchy of the tagging tree system, to detect currently used tags within the incident report, the tags associated with the empty report field, and to use the ML model and prediction algorithm to select the data that matches within the highest percentiles of probability for the incident report and incident. The predictive ML system of the present technology uses the tagging hierarchy of the tagging tree system, which allows for the correlation of statistical data across all incidents, tenants, and industry wide aggregation. Furthermore, the user has the option to accept the auto fill (auto resolving), or reject the auto fill, and revert back to manual data model mapping.

At step 1524, according to various embodiments, a user may select to automatically detect and fill the required empty fields by auto resolving unmapped report fields and auto resolving report fields.

At step 1526, according to various embodiments, the method 1500 proceeds with approving and reviewing the incident report. For example, once all required data has been gathered and mapped, the user may choose to trigger the review and approval sub flow for either the entire incident report, or potentially a subset of tasks or data within the incident report. This process is a sub workflow, and ensures that the incident report progress cannot proceed until these conditions have been satisfied, which may take numerous rounds of review, feedback, approval, or rejection as required.

According to various embodiments, once the incident report has been approved, or the review stage has been completed allowing for the approval stage to continue, the user can trigger the submission stage. Submitting a report is described at step 1528, at step 1530, at step 1532, and at step 1534, according to various embodiments. At step 1528, according to various embodiments, the method 1500 proceeds with saving of the incident report with all required data as a numbered version into the report and state management systems.

Step 1530, according to various embodiments, includes retrieving the destination for the report: (e.g., API, email, PDF, and so forth), schedule the delivery for the incident report (instant, daily, next quarterly, . . . ), and in the appropriate required output format.

At step 1532, according to various embodiments, once the incident reports are finalized, the data, as mapped to the required report fields, is transformed into the format specified in the report template (as described in the FIG. 17A and FIG. 17B). The data formatting is necessary to ensure compliance for internal reporting, customer reporting, and importantly regulatory and compliance requirements. The present systems and methods perform an internal lookup for the required transformations (including any visual and styling elements), and transform the present formatting to, for example, a NIS2 or a CIRCA style report. For example, the incident report format may be plain XML, JSON, XBRL, a custom PDF template, and the like, or a variety of other formats as necessary.

Step 1534, according to various embodiments, includes final submission with all required data, at the correct time, and in the required format, via a delivery mechanism as requested. For example, at this point the incident report may be noted as complete.

Figures 16, 16A:
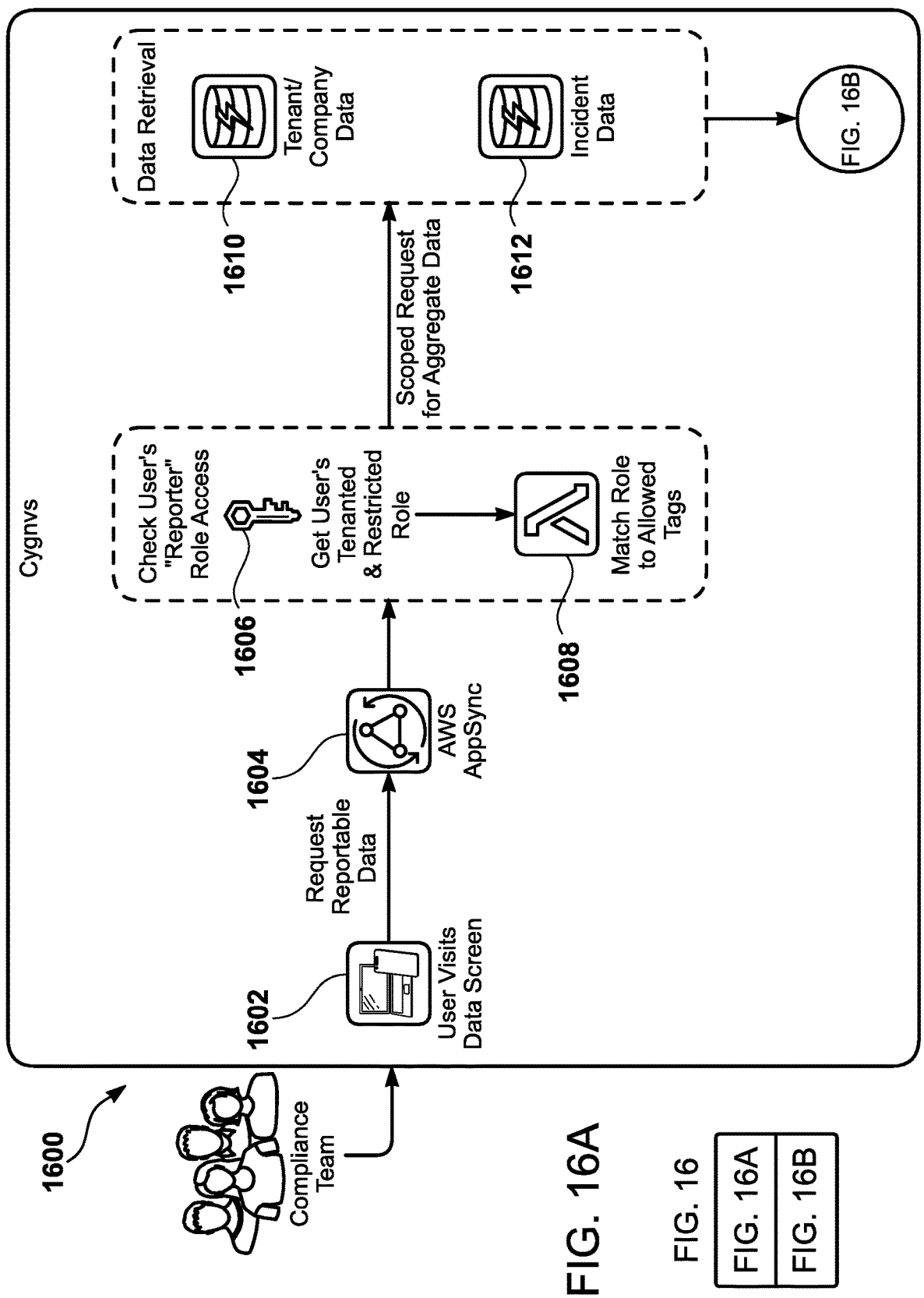
FIG. 16A and FIG. 16B are a flowchart of an example method of the present disclosure related to aggregating and managing reportable incident data from incident reports including data mapping from entity and incident data to incident reports, according to various embodiments.
Figures 16, 16B:
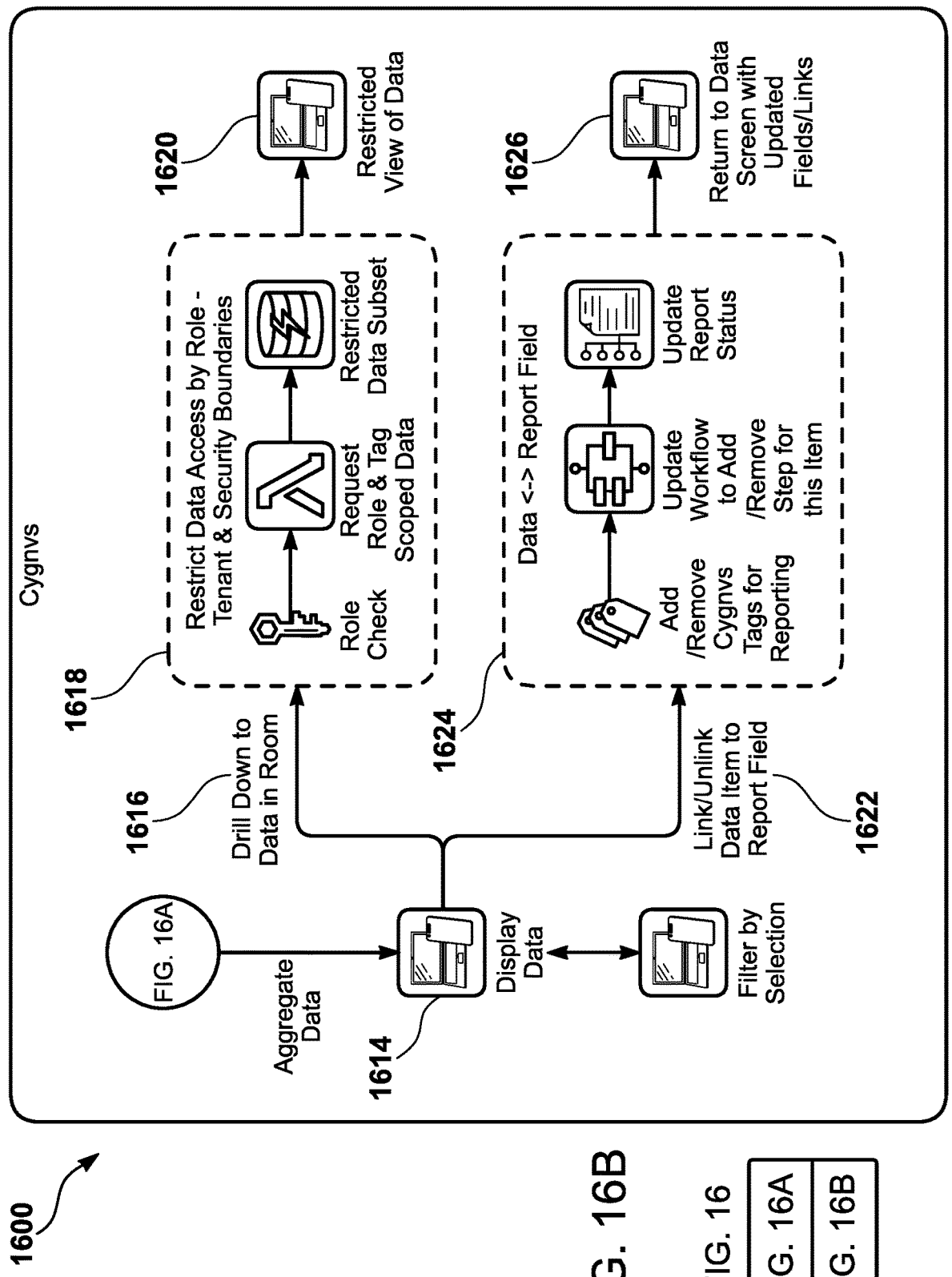

FIG. 16A and FIG. 16B are a flowchart of an example method 1600 of the present disclosure related to aggregating and managing reportable incident data from incident reports including data mapping from entity and incident data to incident reports, according to various embodiments. At step 1602, according to various embodiments, the user visits a data UI for an incident. The data UI enables viewing of all reportable data that the user has privilege to view, based on a previously detailed set of "reporter" roles. The data requested from the platform is a combination of incident specific information, which can be contained with a data workstream, the root of the incident itself, or any other data container within a digital collaboration room. The reportable data may also be "global" information, which will be data relating to the company entity specific as opposed to a specific data incident. For example, all of these entities were previously tagged (using the tagging tree system and tags taxonomy as described in more detail in FIG. 14A and FIG. 14B), which provides a direct mapping to the roles and sub-roles that have been tightly restricted both within the tenant boundary and the data itself. For example, a user's reporter role (Daily Report, NIS2 Reporter, etc. . . . ) may be restricted to seeing the sub types of tagged data they have been allowed to access (#system::report::regulator::nis2, . . . ). This tagged and scoped data may then be retrieved and shown in a consolidated single view of all the relevant data for that incident or incident report. Significantly, these restrictions maintain the current tenant, security, and privilege boundaries within the system enabling data security. For example, user with "reporter" role may have been granted to user X to see a fact within a given workstream, but when user X goes to the data UI, or drills further down into that specific item, user X only is able to view that specific fact and user X is not able to view other information contained within that workstream, thus, the security controls are maintained.

At step 1604, according to various embodiments, a request of the user to access data is forwarded through the standard security gating system of the present technology where the request to access data, or a change in credentials/permissions, cannot be intercepted or altered.

At step 1606, according to various embodiments, a role of the user is retrieved from AWS IAM, and the user authentication and authorization credentials are verified and evaluated based on the request of the user and the permissions of the user to the data. For example, a system session is generated or updated that allows for only the "reportable" data to be retrieved for this request. The "reportable" data may be further restricted by having a hierarchy of further restricted roles. For example, a role that can only access data for an internal report, or for a subset of the data required for NIS2, and the like.

At step 1608, according to various embodiments, the scoped role is moved forward to an AWS Lambda where the permissions are cross checked against the tags that this user role and session have permission to access. These tags were pre-applied to any relevant piece of information within the system, and again are scoped to be within the tenant/company boundary to guarantee no data leakage occurs (using the tags taxonomy as described in more detail in FIG. 14A and FIG. 14B).

At step 1610, according to various embodiments, is enhancing the standard database request to DynamoDB so that the database request not only contains the request within the bounds of the normal user. In other words, the database request is a tenant/entity based request, and is further conditionally scoped to only return records that have the specifically requested tags as part of that record (e.g., system::report::regulator::*).

At step 1612, according to various embodiments, enhancing data access is applied to any record relevant to a given incident. Tag checking is enforced as part of the core security flow and cannot be edited or changed by any actor within the system resulting in enhanced security.

At step 1614, according to various embodiments, the data is then aggregated and returned the data UI. The user may filter their view to see all data in a given incident report, timelines, and other filters as required. The data may also be grouped by the category of data, such as company data, incident data, or workstream/stage data. for example, the data may show the following information (note: this is exemplary list); name, value, type (e.g., global, incident, . . . ); origin (incident, workstream, . . . ); date and time last updated, just to name a few.

At step 1616, according to various embodiments, a user may drill down a data item in the digital collaboration room containing the data element if required.

At step 1618, according to various embodiments, restricting data access by role, tenant/entity and security boundaries and the request trigger the same previously detailed checks to ensure they are allowed access to the data, but much more importantly to ensure that any data they do not have access to is not shown (i.e. show only the one relevant fact in a workstream but nothing else).

At step 1620, according to various embodiments, displaying this tightly restricting view of the data is requested—normal digital collaboration room navigation is possible, but within the same restrictions described herein.

At step 1622, according to various embodiments, the user may link or unlink data to a required report field. For example, the user may be removing or adding new tags to that data, or potentially adding/removing tags to the core workflow prescribed for a given incident report. For example, the same data fields from step 1614 may be shown here, as well as a potential "in use field" to show that this data item has been linked to a given field in an incident report.

At step 1624, according to various embodiments, the user is linking the data they are shown the possible report fields that may apply and may create a linkage between the report field and data. Appropriate tags are added to the underlying data item so that the system of the present technology may determine the current status of the required data for the incident report, and may at a later point make suggestions, or auto create, links or data to missing information required to complete the incident report. This, as mentioned above, will also update the workflow for a particular report, for example, if an item is linked to a report field and has a sub review process already associated with it, this will create a sub review flow and the conditions and add them to the overall workflow. Furthermore, similarly, the removal, or unlinking, of a data item may update or remove the tags on said data item, and also perform similar workflow updates for sub review processes, conditional assignments, and so forth.

FIG. 17A, and FIG. 17B are a flowchart of an example method 1700 of the present disclosure related to managing and automatically generating incident reports including transforming incident data, according to various embodiments.

At step 1702, according to various embodiments, once the incident reports are finalized, the data, as mapped to the required report fields, is transformed into the format specified in the report template. For example, the data formatting is necessary to ensure compliance for internal reporting, customer reporting, and importantly regulatory and compliance requirements. The present systems and methods perform an internal lookup for the required transformations (including any visual and styling elements), and transform the present formatting to, for example, a NIS2 or a CIRCA style report. For example, the incident report format may be plain XML, JSON, XBRL, a custom PDF template, and the like, or a variety of other formats as necessary.

In various embodiments, for example, the incident reports are finalized may trigger report transformation to the necessary format. The report management system may retrieve format and destination requirements from a report library.

At step 1704, a user selects a transformation engine using an Intelligent ML System for transforming selection. The Intelligent ML System scans pre-defined transformations and predicts the confidence level for data transformation. At step 1706, the Intelligent ML System for Transforming selection selects formatting transformation. At step 1708, the Intelligent ML System applies the selected transforming. The schedule delivery for the transformed incident data report is determined by retrieving the destination and schedule. Next, the delivery subsystems used for delivery of the transformed incident data report include cloud APIs and return reference to a transformed incident data report is received in response to sending the transformed incident data report.

FIG. 18A, FIG. 18B, FIG. 19, FIG. 20, FIG. 21, FIG. 22A, FIG. 22B, FIG. 23, FIG. 24A, FIG. 24B, FIG. 25, FIG. 26A, FIG. 26B, FIG. 27A, FIG. 27B, FIG. 28, FIG. 29A, FIG. 29B, FIG. 30A, FIG. 30B, FIG. 31, and FIG. 32 are user interfaces for managing and automatically generating incident reports, according to various embodiments of the present technology. For example, FIG. 18A through FIG. 32 show exemplary user interfaces of the present technology according to some embodiments.

It should be noted that the steps described herein or depicted in any of the figures can be performed in any order. The present disclosure is not limited to merely the specific order of the method steps as described herein. Furthermore, the method steps for any of the exemplary methods provided herein may be performed using any component of the platform, including but not limited to the orchestration service, as depicted in FIG. 1 and as described herein.

Thus, the technology for automatically generating incident data reports is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method comprising:
    receiving incident data from a data incident of an entity tenant, the incident data comprising data workstreams, facts, and tasks;
    establishing, via an orchestration service, a digital collaboration room for the entity tenant in response to the data incident, the entity tenant having control to grant permissions or access rights to users regarding the digital collaboration room and to dynamically modify the permissions of the users in real-time, the entity tenant further having control as to when and how the users access the digital collaboration room, and actions the users can perform against data obtained from a database, the orchestration service being owned by the entity tenant, and is hosted and made accessible to the users;
    generating a token for a user that represents the permissions to the user, the generating the token comprising encoding a tenant identifier, a digital collaboration room identifier, an access right for the user to enter the digital collaboration room, and a secure tenant reporter role for the user, the secure tenant reporter role specifying a first set of permissions that indicate actions that can be performed by the user regarding a data incident report;
    generating a report template, using the digital collaboration room, the generating the report template comprising:
        applying metadata tags to the report template for correlations between the incident data and the first set of permissions;
        applying the secure tenant reporter role for the user using the token based on the first set of permissions;
        applying the secure tenant reporter role to the report template; and
        mapping the data workstreams, the facts, and the tasks of the data incident to the report template;
    generating an incident report using the report template in the digital collaboration room, the incident report comprising a plurality of report fields;
    configuring and managing permissions to the incident report comprising:
        configuring and managing permissions of the users to access the report fields of the data incident report based on the permissions of the users; and
        configuring and managing permissions of the secure tenant reporter role to access the report fields of the data incident report and modify the permissions of the users to access the report fields of the data incident report.

2. The method of claim 1, further comprising:
    generating a plurality of incident reports using the report template in the digital collaboration room; and
    tracking the plurality of data incident reports, the plurality of data incident reports comprising the data incident report.

3. The method of claim 2, further comprising:
    implementing a first feedback loop for the plurality of data incident reports, the first feedback loop comprising:
        automatically surfacing to the users changes to specifications for reporting requirements of the plurality of data incident reports;
        automatically providing specification resolving recommendations for the specifications for the reporting requirements including specific tasks to resolve the specifications for the reporting requirements;
        automatically surfacing to the users changes to error notifications of the incident data of the plurality of data incident reports; and
        automatically providing error resolving recommendations to the error notifications including specific tasks to resolve the error notifications; and
    automatically updating the plurality of data incident reports based on the first feedback loop.

4. The method of claim 2, further comprising:
    implementing a second feedback loop for the plurality of data incident reports, the second feedback loop comprising:
        analyzing the incident data based on statutory reporting requirements to determine if the incident data is applicable to the statutory reporting requirements; and
        automatically mapping and tagging the incident data to reporting data required for the statutory reporting requirements; and
    automatically updating the plurality of data incident reports based on the second feedback loop.

5. The method of claim 1, wherein the data incident report comprises a situational report for an executive team, the situational report for the executive team having hierarchical permissions for access to the plurality of report fields by the executive team.

6. The method of claim 1, wherein the data incident report comprises a regulatory report to be shared with third-party entities, the regulatory report to be shared with third-party entities having hierarchical permissions for access to the plurality of report fields by the third-party entities.

7. The method of claim 1, wherein the data incident report comprises a customer specific report, the customer specific report having hierarchical permissions for access to the plurality of report fields for customers or vendors.

8. The method of claim 1, wherein the applying metadata tags to the report template for correlations between the incident data and the first set of permissions comprises:
    selecting report tags relevant to the report template;
    mapping the entity tenant to the plurality of report fields;
    applying the report tags for the entity tenant; and
    applying the report tags to the plurality of report fields.

9. The method of claim 1, wherein an ability for the grant permissions or access rights to the users regarding the digital collaboration room and to dynamically modify the permissions of the users in real-time is enabled by dynamic tenancy and dynamic provision of the permissions as implemented by the orchestration service.

10. The method of claim 9, wherein the orchestration service maintains the dynamic tenancy.

11. The method of claim 1, further comprising:
receiving a specific triggering fact;
generating a specific report template matching the specific triggering fact in response to the specific triggering fact; and
importing into the digital collaboration room the specific report template.

12. The method of claim 1, further comprising:
analyzing the plurality of report fields by comparing the plurality of report fields to report fields required for a report type to determine missing report fields; and
automatically creating the missing report fields for the report template.

13. The method of claim 1, further comprising:
displaying, using a user interface, the incident report to a compliance team of the entity tenant;
receiving feedback from the compliance team of the entity tenant based on the displaying the incident report; and
automatically updating the incident report based on the receiving feedback from the compliance team.

14. The method of claim 1, further comprising transforming the incident report into a format specified in the report template, the transforming the incident report ensuring compliance for regulatory and compliance requirements.

15. The method of claim 14, further comprising:
receiving approval for the incident report from a compliance team; and
sending the incident report to a regulatory agency.

16. The method of claim 1, wherein the entity tenant has control to dynamically modify the permissions of the users in real-time while the users are active in the digital collaboration room.

17. A system comprising:
a processor; and
a memory for storing executable instructions that, when executed by the processor, cause the processor to perform a method, the method comprising:
receiving incident data from a data incident of an entity tenant, the incident data comprising data workstreams, facts, and tasks;
establishing, via an orchestration service, a digital collaboration room for the entity tenant in response to the data incident, the entity tenant having control to grant permissions or access rights to users regarding the digital collaboration room and to dynamically modify the permissions of the users in real-time, the entity tenant further having control as to when and how the users access the digital collaboration room, and actions the users can perform against data obtained from a database, the orchestration service being a cloud resource where the digital collaboration room, owned by the entity tenant, is hosted and made accessible to the users;
generating a token for each user that represents the permissions to a user, the generating the token comprising encoding a tenant identifier, a digital collaboration room identifier, an access right for the user to enter the digital collaboration room, and a secure tenant reporter role for the user, the secure tenant reporter role specifying a first set of permissions that indicate actions that can be performed by the user regarding a data incident report;
generating a report template, using the digital collaboration room, the generating the report template comprising:
applying metadata tags to the report template for correlations between the incident data and the first set of permissions;
applying the secure tenant reporter role for the user using the token based on the first set of permissions;
applying the secure tenant reporter role to the report template; and
mapping the data workstreams, the facts, and the tasks of the data incident to the report template;
generating an incident report using the report template in the digital collaboration room, the incident report comprising a plurality of report fields;
configuring and managing permissions to the incident report comprising:
configuring and managing permissions of the users to access the report fields of the data incident report based on the permissions of the users; and
configuring and managing permissions of the secure tenant reporter role, to access the report fields of the data incident report and modify the permissions of the users to access the report fields of the data incident report.

18. The system of claim 17, the method further comprising:
generating a plurality of incident reports using the report template in the digital collaboration room; and
tracking the plurality of data incident reports, the plurality of data incident reports comprising the data incident report.

19. The system of claim 18, the method further comprising:
implementing a first feedback loop for the plurality of data incident reports, the first feedback loop comprising:
automatically surfacing to the users changes to specifications for reporting requirements of the plurality of data incident reports;
automatically providing specification resolving recommendations for the specifications for the reporting requirements including specific tasks to resolve the specifications for the reporting requirements;
automatically surfacing to the users changes to error notifications of the incident data of the plurality of data incident reports; and
automatically providing error resolving recommendations to the error notifications including specific tasks to resolve the error notifications; and
automatically updating the plurality of data incident reports based on the first feedback loop.

20. The system of claim 18, the method further comprising:
implementing a second feedback loop for the plurality of data incident reports, the second feedback loop comprising:
analyzing the incident data based on statutory reporting requirements to determine if the incident data is applicable to the statutory reporting requirements; and
automatically mapping and tagging the incident data to reporting data required for the statutory reporting requirements; and
automatically updating the plurality of data incident reports based on the second feedback loop.

21. The system of claim 17, wherein the data incident report comprises a situational report for an executive team, the situational report for the executive team having hierarchical permissions for access to the plurality of report fields by the executive team.

22. The system of claim 17, wherein the data incident report comprises a regulatory report to be shared with third-party entities, the regulatory report to be shared with third-party entities having hierarchical permissions for access to the plurality of report fields by the third-party entities.

23. The system of claim 17, wherein the data incident report comprises a customer specific report, the customer specific report having hierarchical permissions for access to the plurality of report fields for customers or vendors.

24. The system of claim 17, wherein the applying metadata tags to the report template for correlations between the incident data and the first set of permissions comprises:
   selecting report tags relevant to the report template;
   mapping the entity tenant to the plurality of report fields;
   applying the report tags for the entity tenant; and
   applying the report tags to the plurality of report fields.

25. A non-transitory computer-readable storage medium having embodied thereon instructions, which when executed by a processor, perform steps of a method comprising:
   receiving incident data from a data incident of an entity tenant, the incident data comprising data workstreams, facts, and tasks;
   establishing, via an orchestration service, a digital collaboration room for the entity tenant in response to the data incident, the entity tenant having control to grant permissions or access rights to users regarding the digital collaboration room and to dynamically modify the permissions of the users in real-time, the orchestration service being a cloud resource where the digital collaboration room, owned by the entity tenant, is hosted and made accessible to the users;
   generating a token for a user that represents the permissions to the user, the generating the token comprising encoding a tenant identifier, a digital collaboration room identifier, an access right for the user to enter the digital collaboration room, and a secure tenant reporter role for the user, the secure tenant reporter role specifying a first set of permissions that indicate actions that can be performed by the user regarding a data incident report;
   generating a report template, using the digital collaboration room, the generating the report template comprising:
      applying metadata tags to the report template for correlations between the incident data and the first set of permissions;
      applying the secure tenant reporter role for the user using the token based on the first set of permissions;
      applying the secure tenant reporter role to the report template; and
      mapping the data workstreams, the facts, and the tasks of the data incident to the report template;
   generating an incident report using the report template in the digital collaboration room, the incident report comprising a plurality of report fields;
   configuring and managing permissions to the incident report comprising:
      configuring and managing permissions of the users, to access the report fields of the data incident report based on the permissions of the users; and
      configuring and managing permissions of the secure tenant reporter role, to access the report fields of the data incident report and modify the permissions of the users to access the report fields of the data incident report.

* * * * *